United States Patent
Chamberland et al.

(10) Patent No.: US 11,455,207 B2
(45) Date of Patent: Sep. 27, 2022

(54) USING FLAG QUBITS FOR FAULT-TOLERANT IMPLEMENTATIONS OF TOPOLOGICAL CODES WITH REDUCED FREQUENCY COLLISIONS

(71) Applicant: INTERNATIONAL BUSINESS MACHINES CORPORATION, Armonk, NY (US)

(72) Inventors: Christopher Chamberland, Southbury, CT (US); Guanyu Zhu, Yorktown Heights, NY (US); Theodore James Yoder, White Plains, NY (US); Andrew W. Cross, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 387 days.

(21) Appl. No.: 16/512,143

(22) Filed: Jul. 15, 2019

(65) Prior Publication Data

US 2021/0019223 A1  Jan. 21, 2021

(51) Int. Cl.
    *G06N 10/00*     (2022.01)
    *G06F 11/10*     (2006.01)

(52) U.S. Cl.
    CPC ......... *G06F 11/1048* (2013.01); *G06N 10/00* (2019.01)

(58) Field of Classification Search
    CPC ............................ G06F 11/1048; G06N 10/00
    (Continued)

(56) References Cited

U.S. PATENT DOCUMENTS 7,566,896 B2    7/2009   Freedman et al.
8,054,072 B2 *   11/2011   Ichimura ................ G06N 10/00
                                        359/107
(Continued)

FOREIGN PATENT DOCUMENTS

WO    2019032103 A1    2/2019
WO    2019032106 A1    2/2019
(Continued)

OTHER PUBLICATIONS

Fowler et al., "Surface codes: Towards practical large-scale quantum computation", Physical Review A (Atomic, Molecular, and Optical Physics), vol. 86, No. 3, Oct. 26, 2012.
(Continued)

*Primary Examiner* — Albert Decady
*Assistant Examiner* — Enam Ahmed
(74) *Attorney, Agent, or Firm* — Henry J. Daley; Venable LLP

(57) ABSTRACT

A method of error correction for a quantum computer includes identifying each of a plurality of physical qubits arranged in a lattice pattern over a surface in a quantum processor of the quantum computer as a one of a data qubit, an ancilla qubit or a flag qubit to define a plurality of data qubits, ancilla qubits and flag qubits. Each pair of interacting data qubits interact with a flag qubit and adjacent flag qubits both interact with a common ancilla qubit. The method further includes performing measurements of weight-four stabilizers, weight-two stabilizers, or both of a surface code formed using at least a sub-plurality of the plurality of physical qubits, or performing measurements of weight-four Bacon-Shor type gauge operators; and correcting fault-tolerantly quantum errors in one or more of the at least sub-plurality of physical qubits based on a measurement from at least one flag qubit.

25 Claims, 14 Drawing Sheets

(58) Field of Classification Search
USPC .......................................................... 714/746
See application file for complete search history.

(56) References Cited

U.S. PATENT DOCUMENTS

| | | | | |
|---|---|---|---|---|
| 9,940,586 | B1* | 4/2018 | Epstein | H01L 39/223 |
| 10,255,555 | B2 | 4/2019 | Curtis et al. | |
| 2012/0311393 | A1* | 12/2012 | Bueb | G11C 29/52 |
| | | | | 714/E11.03 |
| 2016/0085616 | A1* | 3/2016 | Berkley | G06N 10/00 |
| | | | | 714/746 |
| 2018/0039903 | A1 | 2/2018 | Mosca et al. | |
| 2019/0044542 | A1 | 2/2019 | Hogaboam et al. | |
| 2019/0044543 | A1 | 2/2019 | Chamberland et al. | |
| 2019/0080254 | A1* | 3/2019 | Haah | G06N 10/00 |
| 2020/0119748 | A1* | 4/2020 | Lucarelli | G06N 10/00 |

FOREIGN PATENT DOCUMENTS

| | | | | |
|---|---|---|---|---|
| WO | WO-2020113095 | A1 * | 6/2020 | G06N 10/00 |
| WO | WO-2020181116 | A1 * | 9/2020 | G06N 10/00 |

OTHER PUBLICATIONS

Chao et al.,: "Quantum error correction with only two extra qubits", arxiv.org <http://arxiv.org>, Cornell University Library, 201 Oline Library Cornell University Ithaca, NY 14853, May 5, 2017.

Chamberland et al.,: "Flag fault-tolerant error correction with arbitrary distance codes", arxiv.org <http://arxiv.org>, Cornell University Library, 201 Oline, Library Cornell University, Ithaca, NY 14853, Aug. 7, 2017.

Yoder et al.,: "The surface code with a twist", arxiv.org <http://arxiv.org>, Cornell University Library, 201 Oline Library Cornell University Ithaca, NY 14853, Dec. 14, 2016.

Li et al., "2-D Compass Codes", arxiv.org <http://arxiv.org>, Cornell University Library, 201 Oline Library Cornell University Ithaca, NY 14853, Sep. 4, 2018.

PCT/EP2020/066509 International Search Report dated Dec. 14, 2020.

PCT/EP2020/066509 Written Opinion dated Dec. 14, 2020.

E. Dennis et al., "Topological quantum memory," Journal of Mathematical Physics, vol. 43, pp. 4452-4505, 2002.

A. G. Fowler et al., "Surface codes: Towards practical large-scale quantum computation," Phys. Rev. A, vol. 86, p. 332324, Sep. 2012.

Terhal, "Quantum error correction for quantum memories," Rev. Mod. Phys., vol. 87, pp. 307-346, Apr. 2015.

Bacon et al., "Quantum Error Correcting Subsystem Codes From Two Classical Linear Codes," Oct. 2006.

Aliferis et al., "Subsystem Fault Tolerance with the Bacon-Shor Code," Phys. Rev. Lett., vol. 98, pp. 220502-4, May 2007.

Rigetti et al., "Fully microwave-tunable universal gates in superconducting qubits with linear couplings and fixed transition frequencies," Phys. Rev. B, vol. 81, p. 134507, Apr. 2010.

Chow et al., "Simple all-microwave entangling gate for fixed-frequency super-conducting qubits," Phys. Rev. Lett., vol 107, p. 080502, Aug. 2011.

Barends et al., "Superconducting quantum circuits at the surface code threshold for fault tolerance," Nature, vol. 508, pp. 500-503, Apr. 2014.

Dicarlo et al., "Demonstration of two-qubit algorithms with a superconducting quantum processor," Nature, vol. 460, pp. 240-244, Sep. 2009.

Chen et al., "Qubit Architecture with High Coherence and Fast Tunable Coupling," Phys. Rev. Lett., vol. 113, pp. 220502-5, Nov. 2014.

McKay et al., "Universal gate for fixed-frequency qubits via a tunable bus," Phys. Rev. Applied, vol. 6, p. 064007, Dec. 2016.

Sheldon et al., "Procedure for systematically tuning up cross-talk in the cross-resonance gate," Phys. Rev. A, vol. 93, p. 060302, Jun. 2016.

Chow et al., "Implementing a strand of a scalable fault-tolerant quantum computing fabric," Nature Communications, vol. 5, p. 4015, 2014.

Córcoles et al., "Demonstration of a quantum error detection code using a square lattice of four superconducting qubits," Nature Communications, vol. 6, p. 6979, 2015.

Takita et al., "Demonstration of weight-four parity measurements in the surface code architecture," Phys. Rev. Lett., vol. 117, p. 210505, Nov. 2016.

Takita et al., "Experimental demonstration of fault tolerant state preparation with superconducting qubits," Phys. Rev. Lett., vol. 119, p. 180501, Oct. 2017.

Gambetta et al., "Building logical qubits in a superconducting quantum computing system," npj Quantum Information, vol. 3, No. 1, p. 2, 2017.

Chao et al., "Quantum error correction with only two extra qubits," Phys. Rev. Lett., vol. 121, p. 050502, Aug. 2018.

Chao et al., "Fault-tolerant quantum computation with few qubits," npj Quantum Information, vol. 4, No. 1, p. 42, 2018.

Chamberland et al., "Flag fault-tolerant error correction with arbitrary distance codes," Quantum, vol. 2, p. 53, Feb. 2018.

Tansuwannont et al., "Flag fault-tolerant error correction for cyclic css codes," arXiv:1803.09758, 2018.

Reichardt, "Fault-tolerant quantum error correction for steane's seven-qubit color code with few or no extra qubits," arXiv:quant-ph/1804.06995, 2018.

Chamberland et al., "Fault-tolerant magic state preparation with flag qubits," Quantum, vol. 3, p. 143, May 2019.

Shi et al., "Fault tolerant preparation of approximate GKP states," arXiv e-prints, p. arXiv:1905.00903, May 2019.

Li et al., "2d compass codes," Phys. Rev. X, vol. 9, p. 021041, May 2019.

Tomita et al., "Low-distance surface codes under realistic quantum noise," Phys. Rev. A, vol. 90, p. 062320, Dec. 2014.

Edmonds,"Paths, trees, and owers," Canadian Journal of mathematics, vol. 17, No. 3, pp. 449-467, 1965.

Wang et al., Surface code quantum computing with error rates over 1%, Physical Review A 83, 020302(R) Feb. 2011.

Fowler, "Proof of finite surface code threshold for matching," Phys. Rev. Lett., vol. 109, No. 18, p. 180502, 2012.

Magesan et al., "Effective Hamiltonian models of the cross-resonance gate," arXiv e-prints, p. arXiv:1804.04073v2, Feb. 2019.

IBMQ, IBM Q 5 Yorktown backend specification V1.1.0, https://ibm.biz/qiskit-yorktown, 2018.

Hutchings et al., "Tunable superconducting qubits with flux-independent coherence," Phys. Rev. Applied, vol. 8, p. 044003, Oct. 2017.

Chamberland et al., "Triangular color codes on trivalent graphs with flag qubits", New Journal of Physics, 22, (2020), 023019 pp. 1-23.

Chamberland et al., "Fault-Tolerant Quantum Computing in the Pauli or Cliord Frame with Slow Error Diagnostics," Quantum, vol. 2, p. 43, Jan. 2018.

Baireuther et al., "Neural network decoder for topological color codes with circuit level noise," New Journal of Physics, vol. 21, p. 013003, Jan. 2019.

Cong et al., "Universal Quantum Computation with Gapped Boundaries," Phys. Rev. Lett., vol. 119, p. 170504-5, Oct. 2017.

Bombin, "Topological order with a twist: Ising anyons from an abelian model," Phys. Rev. Lett., vol. 105, p. 030403, Jul. 2010.

Brown et al., "Poking holes and cutting corners to achieve cliord gates with the surface code," Phys. Rev. X, vol. 7, p. 021029, May 2017.

Zhu et al., "Instantaneous braids and dehn twists in topologically ordered states," arXiv:1806.06078, 2018.

Barends, et al., "Superconducting quantum circuits at the surface code threshold for fault tolerance," Nature, vol. 508, No. 7497, pp. 500-503, 2014.

Brown et al., "Handling Leakage with Subsystem Codes," arXiv e-prints, p. arXiv:1903.03937, Mar. 2019.

* cited by examiner

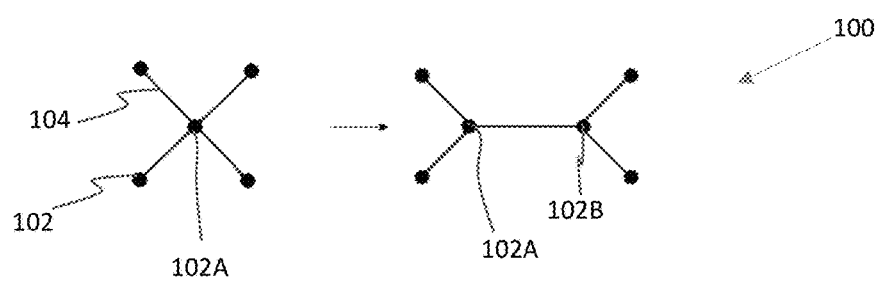
FIG. 1
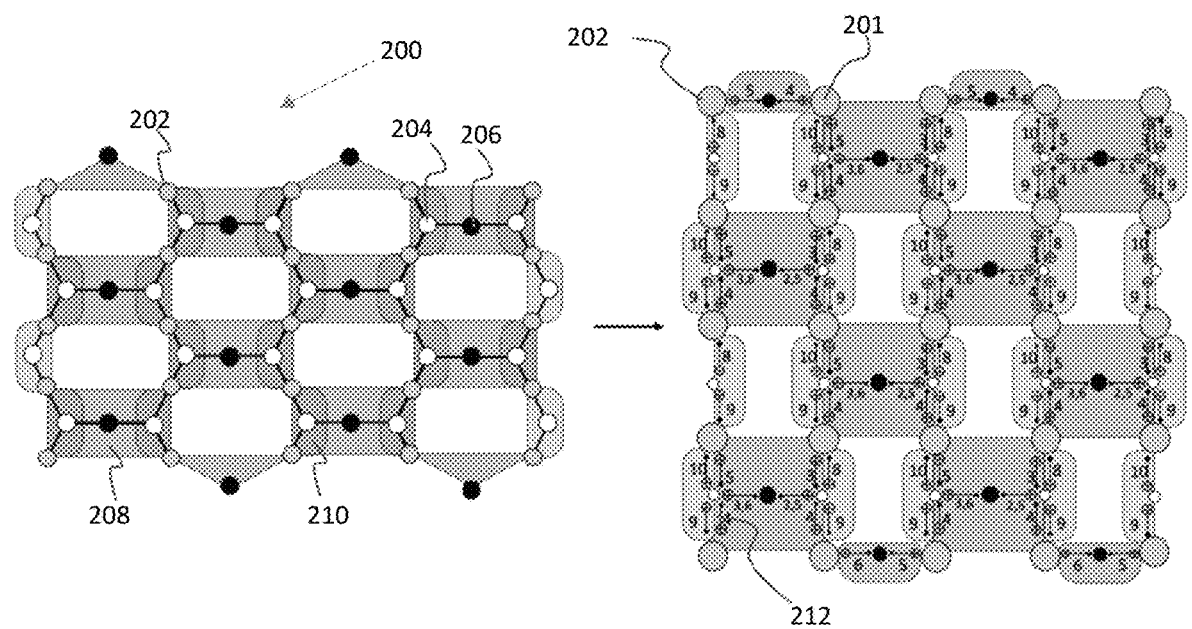
FIG. 2A
FIG. 2B

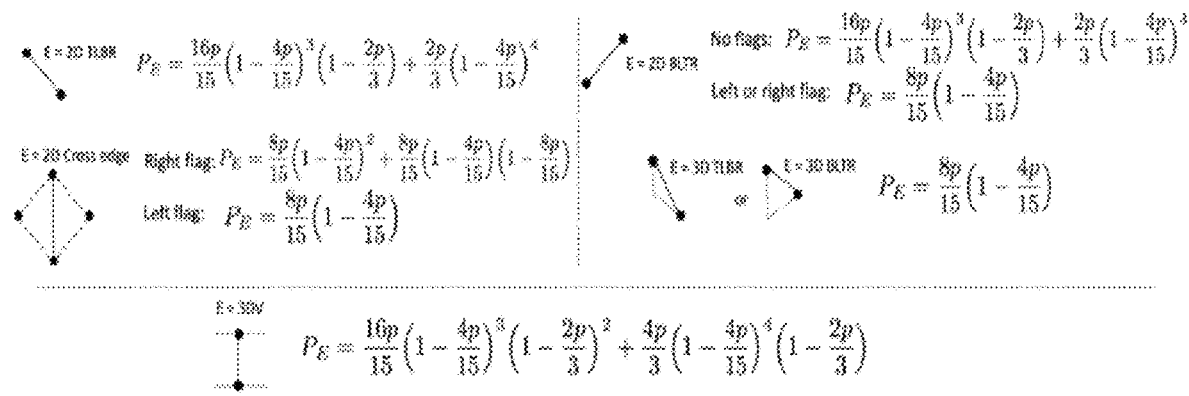
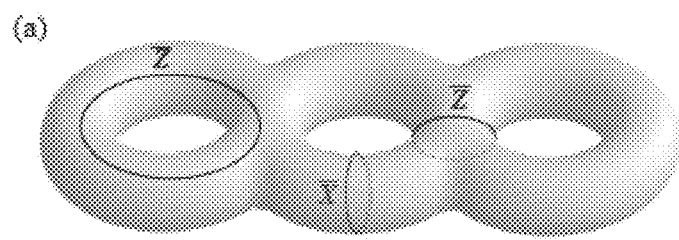
FIG. 19
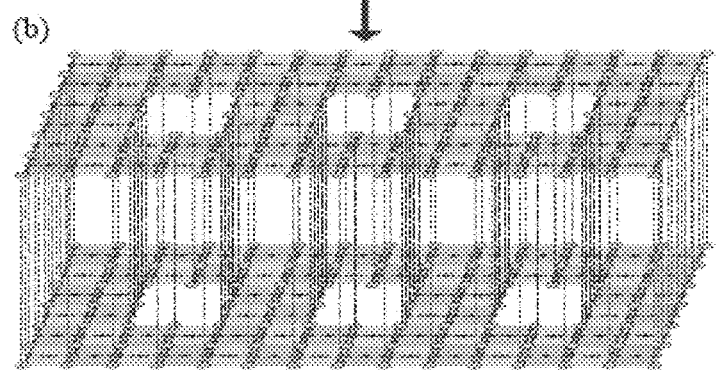
FIG. 20A
FIG. 20B
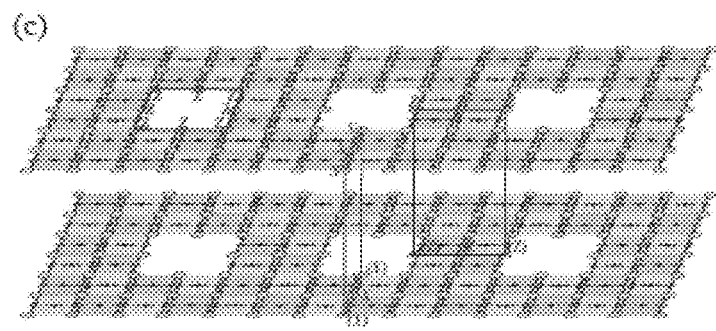
FIG. 20C

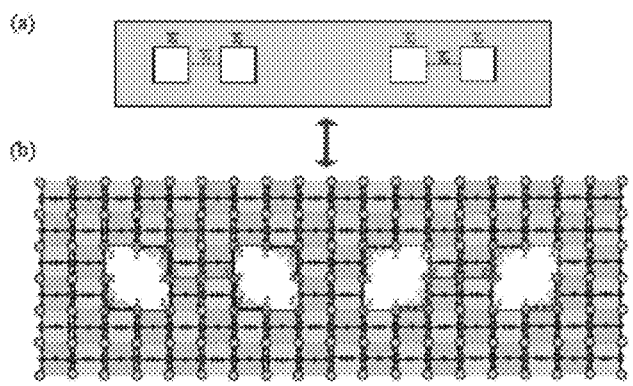
FIG. 21A
FIG. 21B
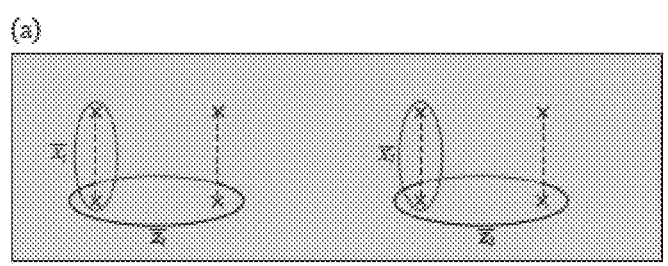
FIG. 22A
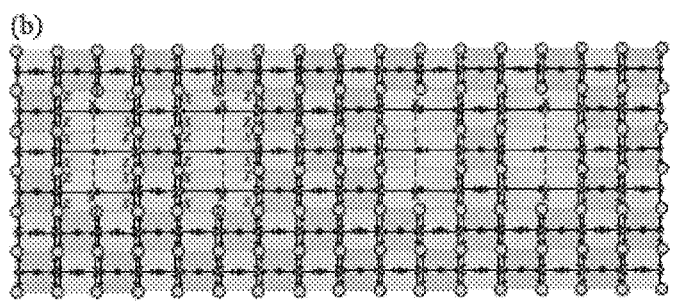
FIG. 22B
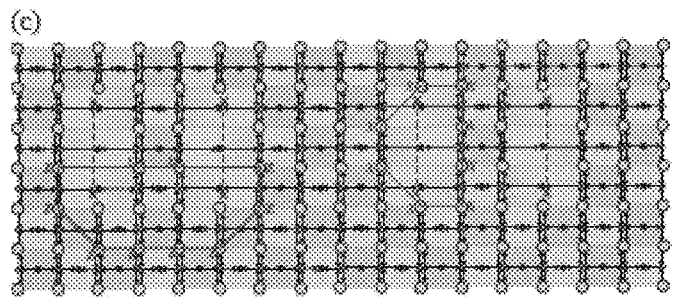
FIG. 22C

USING FLAG QUBITS FOR FAULT-TOLERANT IMPLEMENTATIONS OF TOPOLOGICAL CODES WITH REDUCED FREQUENCY COLLISIONS

BACKGROUND

The currently claimed embodiments of the present invention relate to superconducting quantum computers, related methods, and more specifically, to methods and systems of error correction in a quantum computer.

Fault-tolerant quantum computing with quantum error correcting codes (QECC) is a scalable way to achieve universal quantum computation which will be capable of performing quantum algorithms that offer significant advantages over classical algorithms. With the rapid development of quantum computing platforms such as superconducting circuits and ion traps in the past decade, the path towards achieving logical qubits with $\mathcal{O}(100)$ physical qubits and demonstrating fault tolerance in near term devices looks very promising.

Leading candidates of QECC in the near term include topological stabilizer codes such as the surface code and subsystem codes such as the Bacon-Shor code. These codes belong to the family of quantum low-density-parity-check (LDPC) codes, and hence have syndrome operators composed of low-weight Pauli operators which are independent of the code distance. The standard schemes to implement these types of codes typically chooses a square lattice which is motivated by minimizing the depth of the syndrome measurement circuits while allowing syndrome measurements to be performed using nearest neighbor interactions.

For implementations with superconducting circuits, promising architectures include fixed-frequency transmon qubits coupled via the cross resonance (CR) gates, tunable-frequency transmons coupled via the controlled-phase gate, systems using tunable couplers and so on. In the context of the CR gates, the low overhead of the design results in high fidelity gates which have achieved error rates below 1% and hence approaching the surface code error threshold.

Demonstrations of syndrome measurements and fault-tolerant protocols using post-selection in small scale devices has also been achieved recently. However, to implement the standard surface code within this architecture requires data and ancilla qubits placed on a square lattice, where each vertex has degree four (with four neighboring qubits). Therefore, a minimum of five distinct frequencies is required for the experimental implementation to ensure individual addressability of the CR gates and the avoidance of crosstalk. This imposes a significant challenge to the device fabrication process which has to avoid possible frequency collisions limiting the code performance. Similar problems of crosstalk also exists in other superconducting architectures such as those using the controlled-phase gates.

SUMMARY

An aspect of the present invention is to provide a method of error correction for a quantum computer. The method includes identifying each of a plurality of physical qubits arranged in a lattice pattern over a surface in a quantum processor of the quantum computer as a one of a data qubit, an ancilla qubit or a flag qubit so as to define a plurality of data qubits, a plurality of ancilla qubits and a plurality of flag qubits. Each pair of interacting data qubits in the plurality of data qubits interact with a flag qubit in the plurality of flag qubits and adjacent flag qubits both interact with a common ancilla qubit in the plurality of ancilla qubits. The method further includes performing measurements of weight-four stabilizers, weight-two stabilizers, or both of a surface code formed using at least a sub-plurality of the plurality of physical qubits, or performing measurements of weight-four Bacon-Shor type gauge operators; and correcting fault-tolerantly quantum errors in one or more of the at least sub-plurality of physical qubits based on a measurement from at least one flag qubit.

Another aspect of the present invention is to provide a method for decoding topological codes. The method includes measuring a flag qubit in a vicinity of at least one edge and a cross-edge in a plurality of edges connecting a plurality of vertices in a weight matching graph for an X-type gauge operator measurement or for a z-type stabilizer measurement for a surface code. The method also includes assigning a weight to the at least one edge, the weight depending on a calculated probability of the at least one edge containing a data qubit error. The method further includes updating a weight of the plurality of edges based on the calculated probability; and correcting an error of at least a portion of the plurality of edges based on the updated weight.

A further aspect of the present invention is to provide a system of correcting errors in a quantum computer. The system includes a quantum processor having a plurality of physical qubits arranged in a lattice pattern over a surface of the quantum processor, the plurality of physical qubits comprising a plurality of data qubits, a plurality of ancilla qubits and a plurality of flag qubits. Each pair of interacting data qubits in the plurality of data qubits interact with a flag qubit in the plurality of flag qubits and adjacent flag qubits both interact with a common ancilla qubit in the plurality of ancilla qubits. At least a sub-plurality of the plurality of physical qubits are selected for performing measurements of weight-four stabilizers or weight-two stabilizers, or both of a surface code formed using the at least sub-plurality of the plurality of physical qubits, or for performing measurements of weight-four Bacon-Shor type gauge operators, and correcting fault-tolerantly quantum errors in one or more of the at least sub-plurality of physical qubits based on a measurement from at least one flag qubit.

Yet another aspect of the present invention is to provide a computer-executable medium which when executed by a quantum computer comprising a plurality of coupled physical qubits arranged in a hexagonal lattice or a square lattice, causes the quantum processor to: perform measurements of weight-four stabilizers, weight-two stabilizers, or both of a surface code formed using at least a sub-plurality of a plurality of physical qubits, or perform measurements of weight-four Bacon-Shor type gauge operators. The plurality of physical qubits comprise a plurality of data qubits, a plurality of ancilla qubits and a plurality of flag qubits. Each pair of interacting data qubits in the plurality of data qubits interact with a flag qubit in the plurality of flag qubits and adjacent flag qubits both interact with a common ancilla qubit in the plurality of ancilla qubits. The computer-executable medium when executed by the quantum computer further causes the quantum processor to correct fault-tolerantly quantum errors in one or more of the at least sub-plurality of physical qubits based on a measurement from at least one flag qubit.

BRIEF DESCRIPTION OF THE DRAWINGS

The present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention.

FIG. 1 shows a schematic diagram of a topological code where data qubits and ancilla qubits are represented as vertices and edges represent the connectivity between the data qubits and ancilla qubits, according to an embodiment of the present invention;

FIGS. 2A and 2B show an illustration of a distance five layout of the code on a hexagonal lattice, along with the scheduling of the CNOT gates, according to an embodiment of the present invention;

FIG. 19 shows a calculated probability for various configurations of graphs with edges and vertices, according to an embodiment of the present invention;

FIG. 20A shows a g=3 surface with the illustration of logical strings on three non-contractible cycles, according to an embodiment of the present invention;

FIG. 20B shows an explicit construction of the g=3 surface by identifying the hole boundaries and outer edges of two layers of heavy-square topological codes, according to an embodiment of the present invention;

FIG. 20C shows logical strings corresponding to those shown in FIG. 20A, according to an embodiment of the present invention;

FIG. 21A shows a double Z-cut logical qubit consisting of two smooth whole defects, on the left and a double X-cut logical qubit consisting of two rough hole defects, on the right, according to an embodiment of the present invention;

FIG. 21B depicts the explicit construction of the two types of logical qubits with hole defects on the heavy-square topological code, according to an embodiment of the present invention;

FIG. 22A shows encoding two logical qubits into four pairs of twist defects, according to an embodiment of the present invention;

FIG. 22B shows stabilizers around twist defects, according to an embodiment of the present invention; and FIG. 22C shows two types of logical operators around the twist defects, according to an embodiment of the present invention.

DETAILED DESCRIPTION

Figure 3A:
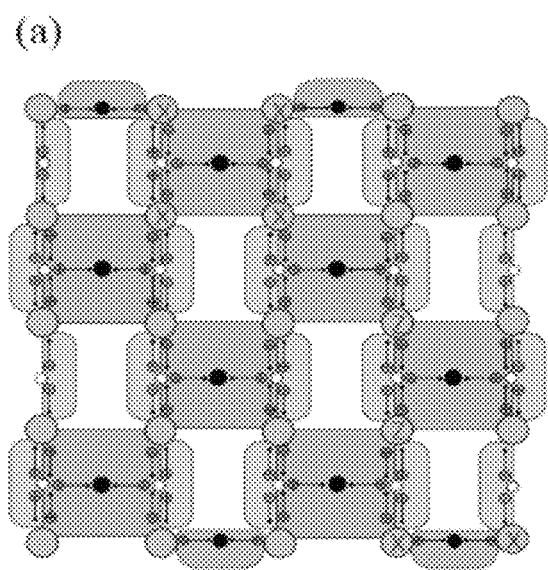
FIG. 3A illustrates gauge operators with weight-four X-type in the bulk, weight-two X-type on the upper and lower boundaries, and weight-two Z-type, according to an embodiment of the present invention.

In this paper, we consider an alternative approach through designing codes on low-degree graphs which can minimize the possibility of frequency collisions and optimize the hardware performance within superconducting qubit architectures. In particular, we have designed a family of subsystem codes on a "heavy hexagon" lattice with a mixture of degree-two and degree-three vertices, which can be considered as a hybrid surface/Bacon-Shor code, and a family of modified surface codes on a "heavy square" lattice with a mixture of degree two and four vertices. These codes reduce the distinct number of frequencies to only three in the bulk. The price of reducing the degree is to introduce more ancilla qubits mediating the entanglement for the syndrome measurement, which results in the increase of the depth of the syndrome extraction circuits and hence potentially increases the logical error rate. On the other hand, the extra ancillas can also become resources for the decoding process. In particular, we have designed a protocol using the ancilla qubits as flag qubits, which allows errors to be corrected up to the full code distance and hence significantly suppresses the logical error rate. When implementing the flag decoder, the heavy square code can achieve an error threshold of approximately 0.3% for both X and Z errors, while the heavy hexagon code achieves a threshold of approximately 0.45% for X errors. Both of them are close to the standard surface-code threshold (approximately 0.67%) with the added benefit of being suitable for superconducting hardware which significantly reduces issues arising from frequency collisions. Our schemes are optimized for architectures using the CR gates, and also remains similarly useful for other architectures such as those using the controlled-phase gates. Note that for the heavy hexagon code, since Z errors are corrected using a Bacon-Shor type decoding scheme, there is no threshold for such errors. However, low logical errors were observed for the code distances that were considered ($d \leq 13$).

In general, we have extended the previous fault-tolerant quantum computation schemes with flag qubits, mainly in the context of small-size codes, to the realm of topological and subsystem codes. The decoding scheme that we introduced which uses information from the flag qubit measurement outcomes is scalable and can be efficiently implemented for large code distances. We have also proved that there exists topological stabilizer codes with flag qubits defined on a general genus-$g$ surface with gapped boundaries and holes, such that our flag decoder can achieve fault tolerance up to the full code distance.

In an embodiment of the present invention, a method of error correction for a quantum computer includes identifying each of a plurality of physical qubits arranged in a lattice pattern over a surface in a quantum processor of the quantum computer as a one of a data qubit, an ancilla qubit or a flag qubit so as to define a plurality of data qubits, a plurality of ancilla qubits and a plurality of flag qubits, wherein each pair of interacting data qubits in the plurality of data qubits interact with a flag qubit in the plurality of flag qubits and adjacent flag qubits both interact with a common ancilla qubit in the plurality of ancilla qubits.

The method further includes performing measurements of weight-four stabilizers, weight-two stabilizers, or both of a surface code formed using at least a sub-plurality of the plurality of physical qubits, or performing measurements of weight-four Bacon-Shor type gauge operators. The method also includes correcting fault-tolerantly quantum errors in one or more of the at least sub-plurality of physical qubits based on a measurement from at least one flag qubit.

In an embodiment, each of the plurality of physical qubits has a resonance frequency selected from a first frequency (f1), a second frequency (f2), a third frequency (f3) or a fourth frequency (f4). The terms first, second, third and fourth frequency must be understood broadly to mean a range of frequencies. However, the range of any of the first, second, third and fourth frequencies does not overlap the range of any other of the first, second, third and fourth frequencies.

In an embodiment, performing the measurements includes interacting the sub-plurality of the plurality of physical qubits using at least one of the first frequency, the second frequency, the third frequency and the fourth frequency. In an embodiment, performing measurements includes measuring an error in a quantum circuit using at least one ancilla qubit and at least two flag qubits, the quantum circuit comprising a sub-plurality of data qubits in the plurality of data qubits and a plurality of gates.

In an embodiment, the method may further include computing an error syndrome based on the measurements. In an embodiment, performing measurements of the weight-four stabilizers or the weight-two stabilizers, or both of the surface code includes performing an X-type stabilizer measurement to measure a phase error. In an embodiment, performing measurements of the weight-four stabilizers or the weight-two stabilizers, or both of the surface code comprises performing a Z-type stabilizer measurement to measure a bit flip error.

In an embodiment, performing the measurements of the weight-four stabilizers or the weight-two stabilizers, or both of the surface code includes performing the measurements on a square lattice code. In an embodiment, performing measurements of weight-four Bacon-Shor type gauge operators comprises performing the measurements on a hexagon lattice code.

In an embodiment, performing measurements of the weight-four stabilizers of the surface code includes detecting weight-two data qubits errors arising from a fault on a C-NOT gate using a sub-plurality of flag qubits in the plurality of flag qubits. In an embodiment, performing measurements of the weight-four stabilizers of the surface code includes measuring operators that determine the presence of errors using a sub-plurality of ancilla qubits in the plurality of ancilla qubits.

In an embodiment, a system of correcting errors in a quantum computer, includes a quantum processor having a plurality a plurality of physical qubits arranged in a lattice pattern over a surface of the quantum processor, the plurality of physical qubits comprising a plurality of data qubits, a plurality of ancilla qubits and a plurality of flag qubits, wherein each pair of interacting data qubits in the plurality of data qubits interact with a flag qubit in the plurality of flag qubits and adjacent flag qubits both interact with a common ancilla qubit in the plurality of ancilla qubits. At least a sub-plurality of the plurality of physical qubits are selected for performing measurements of weight-four stabilizers or weight-two stabilizers, or both of a surface code formed using the at least sub-plurality of the plurality of physical qubits, or for performing measurements of weight-four Bacon-Shor type gauge operators, and correcting fault-tolerantly quantum errors in one or more of the at least sub-plurality of physical qubits based on a measurement from at least one flag qubit.

In an embodiment, each of the plurality of physical qubits has a resonance frequency selected from a first frequency, a second frequency, a third frequency or a fourth frequency. In an embodiment, the at least a sub-plurality of the plurality of physical qubits are selected for performing measurements of an error in a quantum circuit using at least one ancilla qubit and at least two flag qubits, the quantum circuit comprising a sub-plurality of data qubits in the plurality of data qubits and a plurality of gates. In an embodiment, performing measurements of the weight-four stabilizers or the weight-two stabilizers, or both of the surface code includes performing an X-type stabilizer measurement to measure a phase error. In an embodiment, performing measurements of the weight-four stabilizers or the weight-two stabilizers, or both of the surface code comprises performing a Z-type stabilizer measurement to measure a bit flip error. In an embodiment, performing the measurements of the weight-four stabilizers or the weight-two stabilizers, or both of the surface code comprises performing the measurements on a square lattice code. In an embodiment, performing measurements of weight-four Bacon-Shor type gauge operators includes performing the measurements on a hexagon lattice code.

In an embodiment, there is provided a computer-executable medium which when executed by a quantum computer comprising a plurality of coupled physical qubits arranged in a hexagonal lattice or a square lattice, causes the quantum processor to perform measurements of weight-four stabilizers, weight-two stabilizers, or both of a surface code formed using at least a sub-plurality of a plurality of physical qubits, or performing measurements of weight-four Bacon-Shor type gauge operators. The plurality of physical qubits comprise a plurality of data qubits, a plurality of ancilla qubits and a plurality of flag qubits. Each pair of interacting data qubits in the plurality of data qubits interact with a flag qubit in the plurality of flag qubits and adjacent flag qubits both interact with a common ancilla qubit in the plurality of ancilla qubits. The computer-executable medium further causes the quantum processor to correct fault-tolerantly quantum errors in one or more of the at least sub-plurality of physical qubits based on a measurement from at least one flag qubit.

The computer-executable medium or media can be a computer storage medium including any type of disk including floppy disks, optical disks, DVDs, CD ROMs, magnetic optical disks, RAMs, EPROMs, EEPROMs, magnetic or optical cards, hard disk, flash card (e.g., a USB flash card), PCMCIA memory card, smart card, or other media. In another embodiment, the computer executable medium can be downloaded from a remote conventional computer or server via a network such as the internet, an ATM network, a wide area network (WAN) or a local area network. In yet another embodiment, the computer-executable medium can reside in the "cloud" on a server platform, for example. In some embodiments, the computer-executable medium can be embodied as program products in a conventional or classic computer such as a personal computer or server or in a distributed computing environment comprising a plurality of computers that interacts with the quantum computer system by sending instructions to and receiving data from the quantum computer system.

In an embodiment, a method for decoding topological codes includes measuring a flag qubit in a vicinity of at least one edge and a cross-edge in a plurality of edges connecting a plurality of vertices in a weight matching graph for an X-type gauge operator measurement or for a z-type stabilizer measurement for a surface code; and assigning a weight to the at least one edge, the weight depending on a calculated probability of the at least one edge containing a data qubit error. The method further includes updating a weight of the plurality of edges based on the calculated probability; and correcting an error of at least a portion of the plurality of edges based on the updated weight.

In an embodiment, the method may also include determining whether the at least one edge contains a data qubit error based on the measuring the flag qubit, and when the at least one edge contains the data qubit error, calculating a probability of the at least one edge contains the data qubit error.

In an embodiment, the method may further include calculating a probability of another edge in the plurality of edges not containing the data qubit error based on the probability of the at least one edge containing the data qubit error, and assigning a weight to the other edge. In an embodiment, the method may also include selecting a path through the plurality of edges connecting the plurality of vertices having a lowest weight. In an embodiment, the method may also include correcting an error of at least a portion of the plurality of edges depending on the selected path. In an embodiment, the edge may include a data qubit.

The following paragraphs provide various examples of implementation of the above described methods and systems with reference to various configurations. However, as it must be appreciated the claimed invention is not limited to the below described embodiments or examples of implementation but encompasses a broader scope as defined in the claims.

FIG. 1 shows a schematic diagram of a topological code where data qubits and ancilla qubits are represented as vertices 102 of a graph 100 and the edges 102 of the graph 100 represent the connectivity between the data qubits and ancilla qubits, according to an embodiment of the present invention. Given a vertex 102A of degree four (left of FIG. 1), it is always possible to reduce the degree of the vertex 102A to three by adding additional ancilla qubits 102B (right of FIG. 1). By reducing the degree of the connectivity of the graph 100, we will show below that this can potentially reduce the number of frequency collisions that can occur when applying two qubit gates using a cross-resonance interaction. Therefore, by adding an additional ancilla qubit 102B and entangling with the original ancilla 102A, the degree of the connectivity can be reduced by one.

Heavy Hexagon Code: In the following paragraphs we describe a family of topological codes, which we call "the heavy hexagon code," that encodes one logical qubit and is defined on a heavy hexagonal lattice where the degree of each vertex is at most three. FIGS. 2A and 2B show an illustration of the distance five layout of the code on a hexagonal lattice 200, along with the scheduling's of the CNOT gates, according to an embodiment of the present invention. The data qubits (grey vertices) 202 in this code resides on an effective square lattice 201, and can hence be labeled by the row and column indices $(i,j)$ for the following discussions.

FIG. 2A corresponds to the actual layout of the d=5 heavy hexagon code which encodes one logical qubit. The data qubits are represented by grey vertices 202, white vertices 204 are the flag qubits, and dark vertices 206 represent the ancilla qubits to measure the X-type gauge operators (lighter areas) 208 and the Z-type gauge operators (darker areas) 210. In the bulk, products of the two Z-type gauge operators at each white face forms a Z-type stabilizer. FIG. 2B provides a circuit illustration of the heavy hexagon code with the scheduling of the CNOT gates 212 used the measure the X-type and Z-type gauge operators.

Figure 3B:
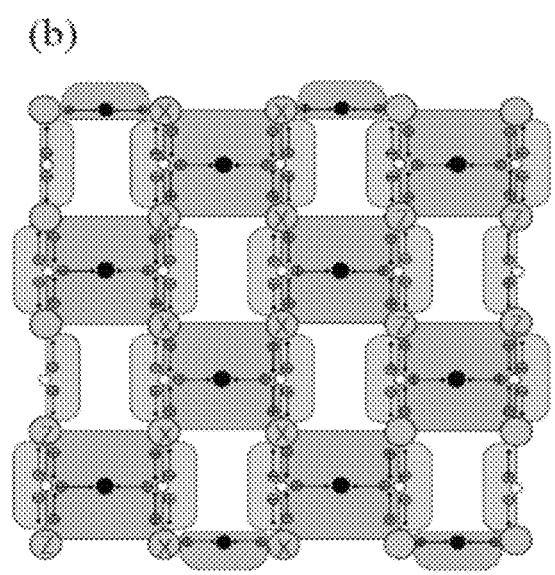
FIG. 3B illustrates stabilizer operators with a two-column vertical strip with X-type, weight-four Z-type in the bulk, and weight-two Z-type on the left and right boundaries, according to an embodiment of the present invention.

FIG. 3A illustrates gauge operators with weight-four X-type in the bulk, weight-two X-type on the upper and lower boundaries, and weight-two Z-type, according to an embodiment of the present invention. FIG. 3B illustrates stabilizer operators with a two-column vertical strip with X-type, weight-four Z-type in the bulk, and weight-two Z-type on the left and right boundaries, according to an embodiment of the present invention. The heavy hexagon code 200 is a subsystem stabilizer code. In this case, the logical information is encoded and protected in a subsystem with Hilbert space $\mathcal{H}_\mathcal{L}$ lying inside a larger Hilbert space, $\mathcal{H} = (\mathcal{H}_\mathcal{L} \otimes \mathcal{H}_\mathcal{G}) \otimes \mathcal{H}_\mathcal{R}$, where $\mathcal{H}_\mathcal{G}$ describes the additional gauge subsystem not necessarily protected against noise and $\mathcal{H}_R$ the rest of the full Hilbert space. The gauge group of the heavy hexagon code is:

$$\mathcal{G} = \langle Z_{i,j}Z_{i+1,j}, X_{i,j}X_{i,j+1}, X_{i+1,j}X_{i+1,j+1}, X_{1,2m-1}X_{1,2m}, X_{d,2m}X_{d,2m+1} \rangle$$

(with i, j=1, 2, ..., d–1, m=1, 2, ..., $$\frac{d-1}{2},$$

and the constraint that i+j is even for the second term), which is generated by weight-two Z-type gauge operators (blue areas), weight-four X-type gauge operators (red areas) in the bulk, and weight-two X-type gauge operators (red areas) on the upper and lower boundaries, as illustrated in FIG. 3A.

Here, d is the code distance, and is, for example, taken to be odd herein in order to optimize the logical error rate. The Z-type and X-type gauge operators are used to correct bit-flip and phase errors respectively. The stabilizer group which specifies the logical subspace $\mathcal{H}_L$ is:

$$\mathcal{S} = \langle Z_{i,j}Z_{i,j+1}, Z_{i+1,j}Z_{i+1,j+1}, Z_{2m,1}Z_{2m+1,1}, Z_{2m-1,1}Z_{2m,1}, \prod_i X_{i,j}X_{i,j+1} \rangle$$

(with the constraint i+j is odd for the first term). Here, $Z_{i,j}Z_{i,j+1}, Z_{i+1,j}Z_{i+1,j+1}$ is a weight-four surface-code type stabilizer in the bulk, which can be measured via taking the product of the measured eigenvalues of the two weight-two gauge operators $Z_{i,j}Z_{i+1,j}$ and $Z_{i,j+1}Z_{i+1,j+1}$.

As further described in the following paragraphs, the way Z-stabilizers can be factorized may greatly reduce the circuit depth for syndrome measurements, and hence can significantly suppress error propagation. In addition to the bulk stabilizers, weight-two surface-code type stabilizers lie on the left and right boundaries. On the other hand, $\Pi_i X_{i,j}X_{i,j+1}$ is a Bacon-Shor type stabilizer, where the Pauli-X operators are supported on a two-column vertical strip, as illustrated in FIG. 3B. It can be measured via taking the product of the measured eigenvalues of all the weight-four bulk X-type gauge operators and weight-two boundary X-type gauge operators lying inside the strip. All the gauge operators inside the gauge group $\mathcal{G}$ commute with the stabilizers in the group $\mathcal{S}$, which are themselves mutually commuting. However, the overlapping gauge operators with different Pauli types do not necessarily commute. Therefore, only the stabilizer eigenvalues are used to infer the errors. The heavy hexagon code can be considered as a hybrid surface/Bacon-Shor code, where the X and Z errors can be corrected respectively with the surface-code type and Bacon-Shor type decoding procedure respectively. The surface-code part of this code is a (classical) topological code, and we will show that the flag qubit measurement outcomes can be used to ensure that the code can correct errors up to the full code distance.

We note that, compass codes, which are defined as gauge-fixes of Bacon-Shor codes, were studied for the purpose of dealing with asymmetric noise models. Such codes include rotated surface codes and Bacon-Shor codes. Thus ignoring the extra ancilla qubits of the heavy hexagonal lattice, the heavy hexagon code can be viewed as belonging to the compass code family.

In general, a distance d version of the code will have d data qubits along each row and each column of the hexagonal lattice so that the code parameters are given by $[\![ d^2, 1, d]\!]$. In addition, a distance d implementation of the code uses a total $$\frac{d+1}{2}(d-1) + d(d-1)$$

ancilla and flag qubits. Hence the total number of qubits in the implementation of the code is $$\frac{5d^2 - 2d - 1}{2}.$$

FIG. 1 depicts a circuit diagram for performing the X and Z-type parity measurements of a heavy hexagon code, according to an embodiment of the present invention. Circles 1, 2, 3 and 4 represent data qubits. Circles 5 and 6 represent flag qubits. Circle 7 represents an ancilla qubit. Two flag qubits are used to measure the weight-four X-type gauge operators. Note that since flag qubits are used to reduce the degree of the connectivity of the heavy hexagon code to at most three, X-type operators cannot be measured simultaneously with Z-type operators. The CNOT scheduling was chosen to minimize the total number of time steps for the X and Z-type gauge operator measurements. Therefore, one round of syndrome measurements may use a total of 11 time steps, which includes ancilla and flag qubit initialization and measurement.

Although the circuit depth of the heavy hexagon code is larger than that of rotated surface code (which requires a total of six time steps for the X and Z stabilizer measurements), the flag qubits can be used to correct weight-two errors arising from a single fault during the weight-four X-type gauge operator measurements.

FIG. 2 is a circuit diagram depicting flag qubit outcomes arising from a single fault resulting in a weight-two data qubit error during the measurement of a weight-four operator, according to an embodiment of the present invention. In this embodiment, the flag qubits are prepared in the $|+\rangle$ state and measured in the X basis. A decoding algorithm which uses information from the flag measurement outcomes can be used to correct errors up to the full distance of the code, as will be described further in the following paragraphs.

An ingredient in the implementation of minimum weight perfect matching using Edmond's method is the matching graphs used to correct X and Z-type Pauli errors with appropriate edges and edge weights.

FIGS. 3A-6C depict two-dimensional graphs for the distance-five heavy hexagon code, according to an embodiment of the present invention. FIG. 6A shows an example of the minimum weight matching graph for five rounds the X-type gauge operator measurements of the d=5 heavy hexagon code. Since only the parity of the gauge operator measurements of a given outcome is used to correct errors, for one measurement round, the graph is one-dimensional. Diagonal edges connecting two consecutive one-dimensional graphs are necessary to correct space-time correlated errors arising from CNOT gate failures. The weights and directions of the diagonal edges depends on the CNOT gate scheduling and are chosen such that a single fault in the measurement circuits corresponds to an edge in the final graph. Labels $m$, $b_1$ $b_u$ $d_1 d_1'$ and $d_2$ correspond to edges with different weights computed based on the probabilities of occurrence for a given edge. The edge $d_1'$ is a bulk feature that only appears in odd columns excluding the first and last column (for instance, columns three and five in the d=7 graph would contain edges $d_1'$. More details are provided in the following paragraphs, at Appendix A.

Figures 6A, 6B, 6C:
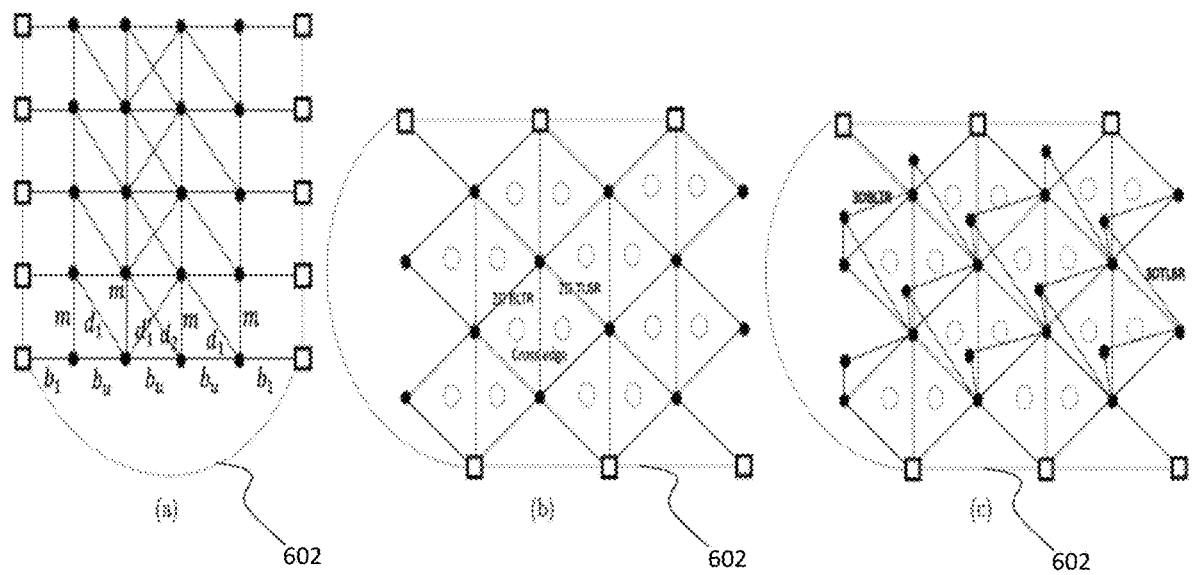
FIGS. 6A-6C depict two-dimensional graphs for a distance-five heavy hexagon code, according to an embodiment of the present invention.

FIG. 6B shows an example of the minimum weight matching graph for one round of the Z-type stabilizer measurements of the d=5 heavy hexagon code. The full graph for d rounds of Z-type stabilizer measurements is three-dimensional. Cross edges are given by dashed lines since they are only present in the presence of non-trivial flag measurement outcomes (during the X-type gauge operator measurements) represented by green circles. More details are provided in the following paragraphs.

FIG. 6C shows diagonal edges connecting two-dimensional graphs are added to ensure that a single fault in the measurement circuits corresponds to an edge in the final graph. The graphs are constructed by assigning an edge to each data qubit and vertices for the ancilla qubits used to measure the X-type gauge operators (FIG. 6A) and Z-type stabilizers (FIG. 6B). The edges 602 are boundary edges which have zero weight. The squares are a representation of the edges. The black circles are the vertices and the white circles inside the diamond shapes represent the flag qubits. In general, edge weights are given by $w_E = -\log P_E$ where $P_E$ is the total probability of error configurations resulting in an error at the edge E (edge weight calculations of the heavy hexagon and heavy square code are provided in Appendix A). Correctable Z-type errors will result in highlighted vertices of the graph in FIG. 6A while correctable X-type errors will result in highlighted vertices of the graph in FIG. 6B. If an odd number of vertices are highlighted, a square vertex (chosen at random) is highlighted to ensure that the total number of highlighted vertices is always even. To detect measurement errors, the gauge operator measurements may be repeated d times. Thus the matching graph consists of d copies of the matching graph for one round of gauge operator measurements with vertices connected by vertical edges. For the X-type gauge operator measurements, we obtain a two-dimensional graph whereas for the Z-type stabilizers, we obtain a three-dimensional graph. In addition, diagonal edges connecting the graphs from two consecutive measurement rounds must be added to ensure that any single fault in the circuits of FIG. 4 corresponds to an edge in the final graph. Minimum weight perfect matching is then applied on the subgraph of highlighted vertices.

Figure 7:
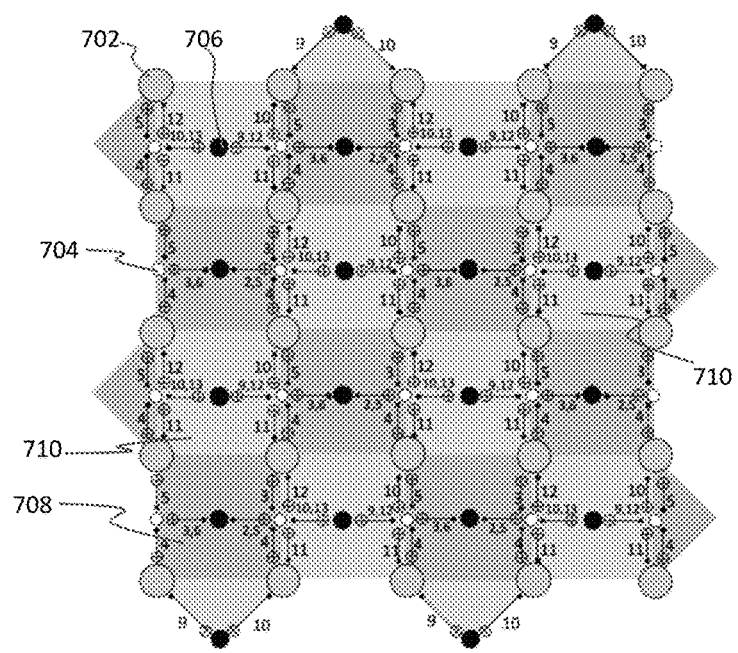
FIG. 7 is a schematic illustration of a dimension d=5 heavy square code with the scheduling of the CNOT gates, according to an embodiment of the present invention.

Heavy Square Code: In the following paragraphs we describe a family of surface codes that are mapped onto a heavy square lattice. By considering the lattice of the rotated surface code, in the bulk, each ancilla qubit interacts with four data qubits. By adding two flag qubits to each stabilizer measurement in the bulk, the rotated surface code can be mapped onto a heavy square lattice, as shown in FIG. 7. FIG. 7 is a schematic illustration of a dimension d=5 heavy square code with the scheduling of the CNOT gates, according to an embodiment of the present invention. The data qubits are represented by vertices 702, white vertices 704 are the flag qubits and the dark vertices 706 are the ancilla qubits. The faces 708 correspond to X-stabilizer measurements and the faces 710 to Z-stabilizer measurements.

The distance d code belonging to the family has parameters $[\![d^2, 1, d]\!]$ with $d^2$ data qubits and $2d(d-1)$ flag and ancilla qubits. Hence the total number of qubits required for the implementation of the code is $3d^2-2d$. In what follows, the code family will be referred to as "the heavy square code." With the addition of the flag qubits, it can be seen that a degree of both ancilla and data qubits is reduced to two in the bulk, at the cost of having flag qubits with degree four. More details are provided in the following paragraphs showing that the heavy square code does reduce the number of frequency collisions relative to the standard implementation of the surface code.

Figure 4:
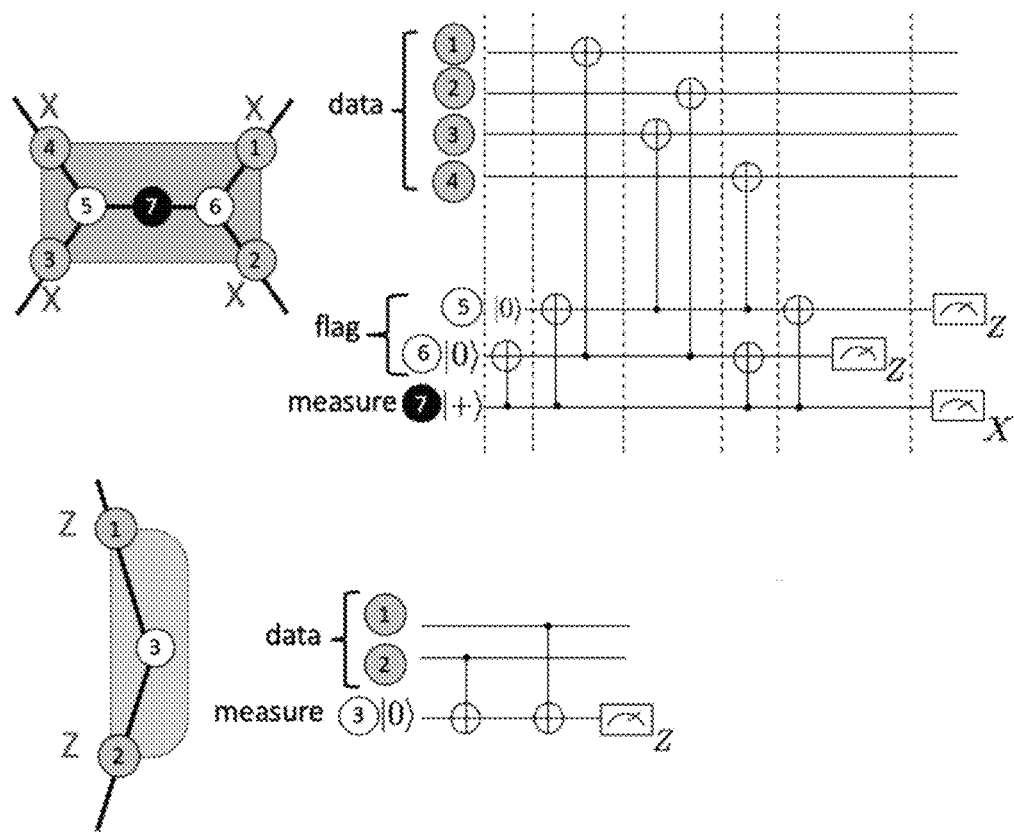
FIG. 4 depicts a circuit diagram for performing the X and Z-type parity measurements of a heavy hexagon code, according to an embodiment of the present invention.
Figure 8:
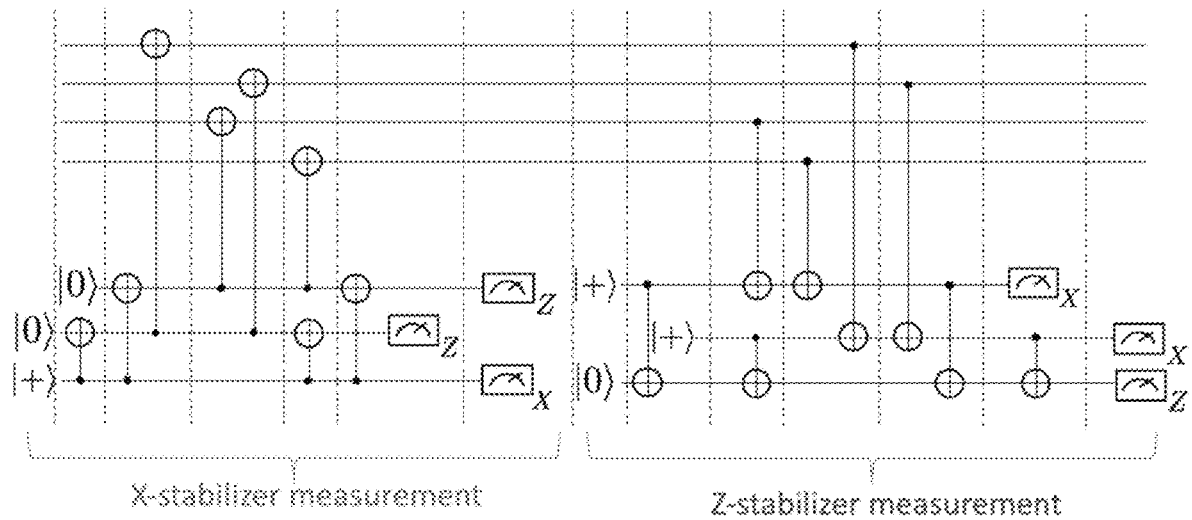
FIG. 8 depicts a circuit for the measurement of the X-stabilizers followed by the Z-stabilizers of the heavy square code, according to an embodiment of the present invention.
Figure 9A:
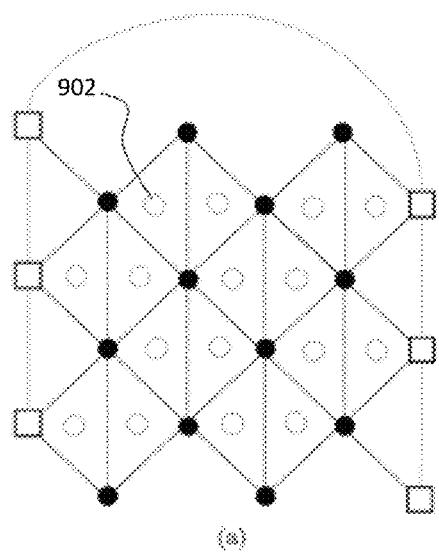
FIG. 9A shows an example of a graph used to implement minimum weight perfect matching for the dimension d=5 heavy square code for Z-type stabilizer measurements, according to an embodiment of the present invention.
Figure 9B:
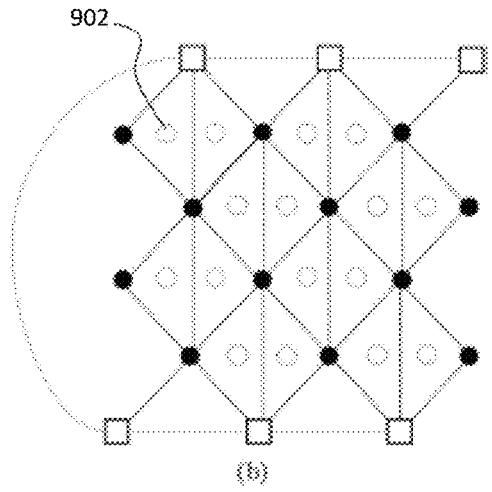
FIG. 9B shows an example of a graph used to implement minimum weight perfect matching for the dimension d=5 heavy square code for X-type stabilizer measurements, according to an embodiment of the present invention.

The circuit for measuring the X and Z stabilizers of the heavy square code in the bulk, following the CNOT scheduling of FIG. 7, is illustrated in FIG. 8. FIG. 4 depicts a circuit for the measurement of the X-stabilizers followed by the Z-stabilizers of the heavy square code, according to an embodiment of the present invention. As shown in FIG. 8, the total number of time steps required to perform the stabilizer measurements is 14, compared to 11 for the heavy hexagon code. The increase in the number of time steps compared to the heavy hexagon code is due to the fact that both X and Z stabilizers have weight four compared to the weight-two Z-type gauge operators of the heavy hexagon code. Examples of the matching graphs for the d=5 heavy square code are shown in FIGS. 9A and 9B. FIG. 9A shows an example of a graph used to implement minimum weight perfect matching for the d=5 heavy square code for Z-type stabilizer measurements, according to an embodiment of the present invention. FIG. 9B shows an example of a graph used to implement minimum weight perfect matching for the d=5 heavy square code for X-type stabilizer measurements, according to an embodiment of the present invention. The vertices 902 in FIG. 9A correspond to flag measurement outcomes during X-stabilizer measurements. Similarly, the vertices 902 in FIG. 9B correspond to flag measurement outcomes during Z-stabilizer measurements.

One remark regarding the role of the flag qubits for the heavy square code may be highlighted. The logical $\overline{X}$ operator of the heavy square code has minimum support on d qubits along each column of the lattice. From the CNOT scheduling of FIG. 7, a weight-two X error arising from a single fault (which will result in a non-trivial flag measurement outcome) will be orthogonal to $\overline{X}$ since its support will remain in one column. On the other hand, a logical $\overline{Z}$ operator of the heavy square code will have support on each row of the lattice. A weight-two Z error arising from a single fault will thus be parallel to $\overline{Z}$ (since just like for X errors, its support will be along a single column). For the surface code, this problem can be avoided by finding a scheduling such that weight-two errors arising from a single fault are always orthogonal to the logical operator of the same type. Such a scheduling may not be possible for the heavy square code when the flag qubits are used to reduce the degree of data qubits and ancilla qubits. Hence, if the flag measurement outcomes are omitted when decoding the heavy square code, the effective distance of the code $d_{\mathit{eff}}$ would satisfy $d_{\mathit{eff}} < d$. In the following paragraphs, we provide a decoder that uses the flag measurement outcomes allowing such weight-two Z errors arising from a single fault (which are parallel to $\overline{Z}$) to be corrected. We will show that with such a decoder, the code can correct any error arising from at most $(d-1)/2$ faults so that $d_{\mathit{eff}} = d$.

The cross resonance gates and frequency collision reduction: The design of the heavy hexagon and heavy square codes is motivated by the experimental implementation of fault-tolerant quantum computation with a superconducting architecture. The low-degree property of the graphs can significantly mitigate the issues of frequency collision and crosstalk, and is applicable to a wide range of architectures including cross-resonance (CR) gates, controlled phase gates, and systems with tunable couplers. In the following paragraphs, we show that our codes are optimized for a CR gate architecture, for example.

The CR gate implements a CNOT between a control and a target qubit, using only microwave pulses and not the magnetic flux drive needed in other gate types. When employed to couple fixed-frequency transmon qubits via microwave-resonant buses, this architecture is hardware-efficient and immune to most dephasing noise. The current fidelity of the gate can exceed 0.99, approaching the error threshold for the surface code. Small-scale multi-qubit demonstration of fault-tolerant protocols has been achieved recently.

In the CR gate, a drive tone at the target qubit's resonance frequency is applied to the control qubit. This can produce 'frequency collisions' among nearby qubits whose energies are degenerate. As transmon qubits are weakly anharmonic, the $|0\rangle \rightarrow |1\rangle$, $|1\rangle \rightarrow |2\rangle$ and $|0\rangle \rightarrow |2\rangle$ transitions are all relevant. Two nearest-neighbor qubits may not have degenerate $\omega_{01}$, nor one qubit's $\omega_{01}$ degenerate with another's $\omega_{12}$ or $\omega_{02}/2$. Among next-nearest-neighbor qubits joined to a common control qubit, degeneracies of $\omega_{01}$ and $\omega_{12}$ are also forbidden, as is a control qubit's $\omega_{02}$ being degenerate with the summed $\omega_{01}$ of two of its nearest neighbors. On the other hand, if a control and target's $\omega_{01}$ frequencies are too far apart, the gate rate becomes too slow. To avoid all these collision conditions, we designate each qubit to have one of a minimal set of distinct frequencies according to a defined pattern. The relative frequencies of nearest-neighbor qubits therefore fix the CNOT direction among each pair. In order to reverse certain CNOT directions to implement the measurement circuits in the codes described above, we can conjugate the existing CNOT by Hadamard gates on the control and target qubits. Since the single-qubit errors on current superconducting architectures are at least an order of magnitude lower than the two-qubit gate fidelities, the errors due to these extra Hadamard gates are negligible.

Figure 10A:
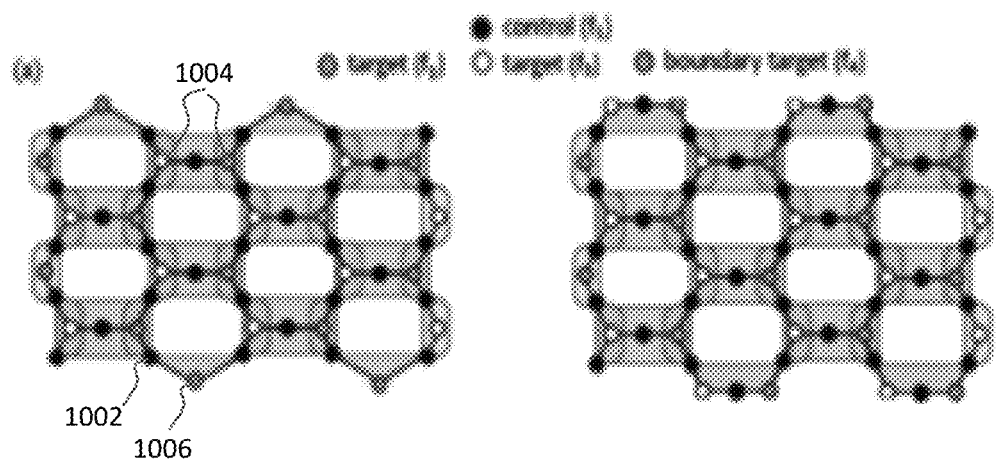
FIGS. 10A and 10B depict frequency assignments of the heavy hexagon code (a) and the heavy square code (b), according to an embodiment of the present invention.
Figure 10B:
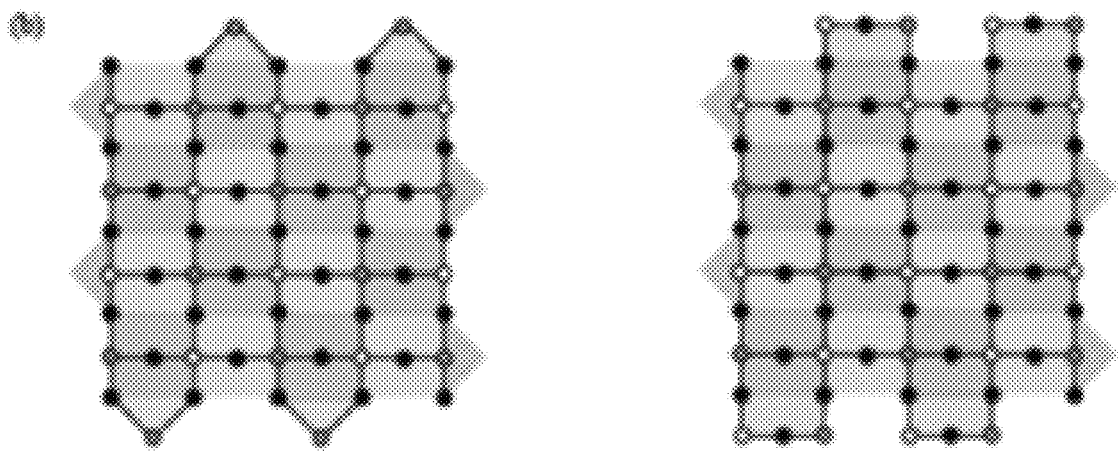

FIGS. 5A and 10B depict frequency assignments of the heavy hexagon code (a) and the heavy square code (b), according to an embodiment of the present invention. Solid black lines indicate the actual connections and CNOT gates in the fabricated superconducting device. The black dots indicate control qubits, while the other three circles indicate target qubits, as shown at the top of FIG. 10A. The original heavy hexagon and heavy square codes on the left panels feature three distinct frequencies in the bulk and an additional frequency on the boundary, while the modified codes on the right panels remove the extra frequencies (white dots) on the boundaries. The control qubits are represented by black dots 1002 assigned with frequency $f_1$, while the target qubits in the bulk are represented by dots 1004 corresponding to frequency $f_2$ and $f_3$. In addition, in both codes, there are additional boundary target qubits with frequency $f_4$ represented by dots 1006 (shown in the left panels). In both the heavy hexagon and heavy square codes, the controls reside on the degree-two vertices of the graph, such that they only have at most two neighboring targets. With this configuration, there are only three distinct frequencies ($f_1$, $f_2$ and $f_3$) in the bulk, which greatly reduces the possibility of frequency collisions. We note that the extra frequency $f_4$ from the boundary targets are due to the modification/simplification of the heavy hexagon and heavy square lattice structure on the boundaries in order to shorten the circuit depth of the boundary gauge or stabilizer operators. If we recover the original heavy hexagon and heavy square lattice structure on the boundaries at the price of introducing additional ancilla qubits and increase the depth of the measurement circuits (as shown on the right panels of FIGS. 10A and 10B), we will again have only three distinct frequencies (i.e., removing all the dots 1006). By contrast, a rotated surface code architecture, in which all qubits reside on degree-four vertices, has five distinct frequencies in order to avoid all collision conditions.

For practical implementations, a code with its graph and set of frequencies has to be robust against the disorder that develops among dozens of transmon qubits prepared together on a single chip. This disorder, arising from imperfections in fabrication, may be characterized by the parameter $\sigma_f$, the standard deviation in frequency of a population of fixed-frequency transmons. For typical multi-qubit devices, whose transmons have $f_{01} \sim 5$ GHz and $f_{12}-f_{01} \sim -330$ to 340 MHz, achieving $\sigma_f < 50$ MHz requires all device parameters to be controlled with precision better than 1%. This may not be a simple task when the transmons incorporate nanoscale tunnel junctions and capacitances of tens of fF. We seek, therefore, to find a code for which the transmons may have the largest possible imprecision $\sigma_f$ while still avoiding frequency collisions. For quantitative comparison, we perform Monte Carlo simulations in which lattices of FIGS. 10A and 10B and related or other designs are populated with a random disorder in frequency characterized by $\sigma_f$, and the number of collisions are counted according to the descriptions listed above (including forbidden regions of frequency space around each collision condition).

Figure 11:
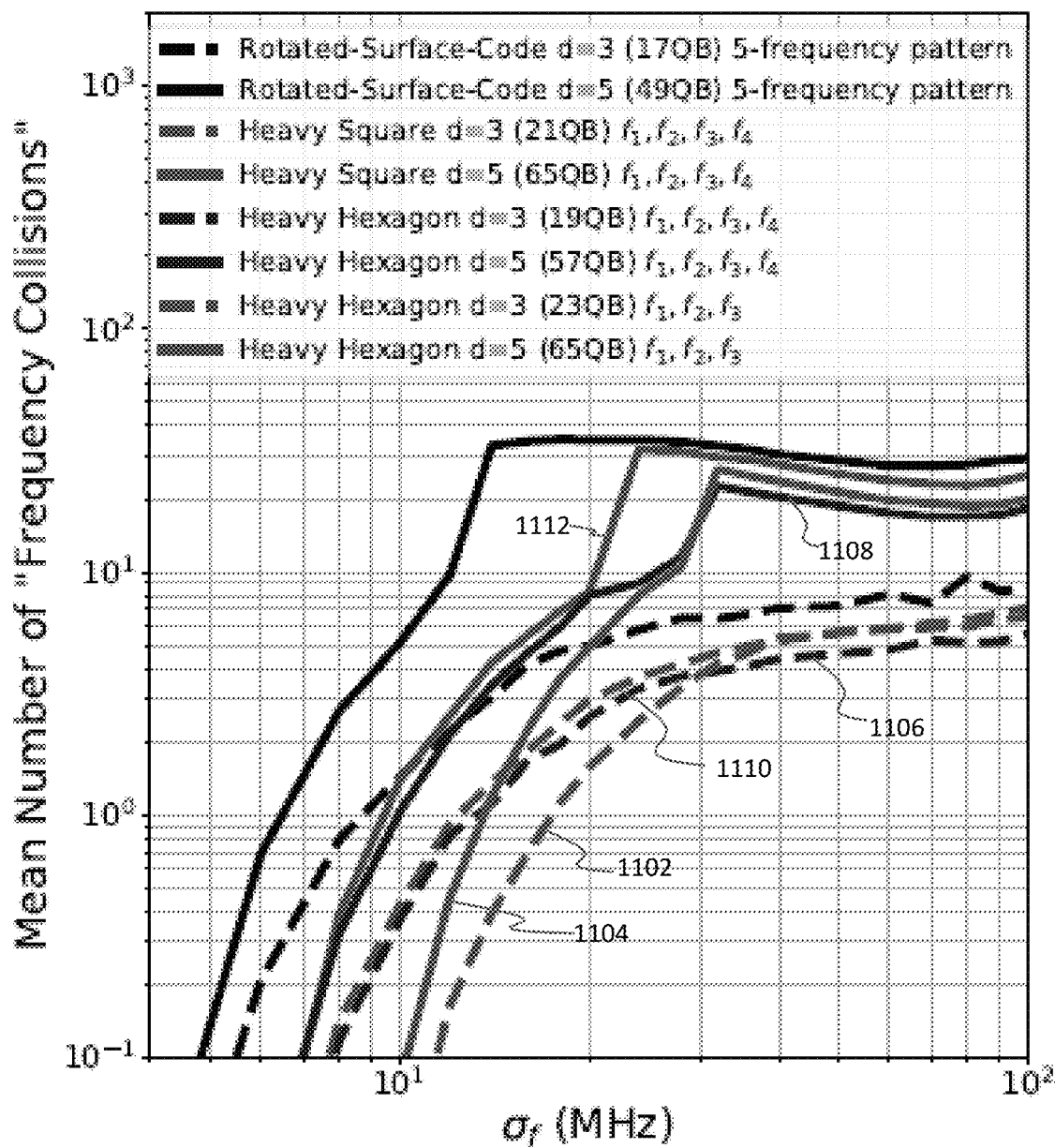
FIG. 11 is a graph of a mean number of frequency collisions versus a standard deviation in frequency of a population of fixed-frequency transmons obtained by Monte Carlo simulations, according to an embodiment of the present invention.

FIG. 6 is a graph of a mean number of frequency collisions versus the parameter $\sigma_f$ corresponding to the standard deviation in frequency of a population of fixed-frequency transmons obtained by Monte Carlo simulations, according to an embodiment of the present invention. Therefore, FIG. 11 shows the Monte Carlo simulations of the collision rate due to qubit frequency scatter caused by fabrication imprecision. Averages of $>10^3$ Monte Carlo repetitions. The x-axis is the frequency precision of the fabrication, $\sigma_f$ (MHz). The y-axis is the mean number of collisions for each device for each value of $\sigma_f$. Heavy hexagon code: d=3 with the 3-frequency design in the right panel of FIG. 10A; d=5 with the 3-frequency design in the right panel of FIG. 10A; d=5 with the 4-frequency design in the left panel of FIG. 10A. Heavy square code: d=3 with the 4-frequency design in the right panel of FIG. 10A; d=5 with the 3-frequency design in the right panel of FIG. 10B. Rotated surface code, degree 4 and five-frequency pattern: d=3 (black dashed line); d=5 (black solid line). In FIG. 11, we show the mean number of collisions found among various lattices as a function of $\sigma_f$, each case derived from at least $10^3$ Monte Carlo repetitions. As a practical matter, we seek to achieve <1 average collision. We see that in any case, for example, this goal is achievable only for precisions $\sigma_f < 30$ MHz.

For all three types of codes, i.e., the heavy hexagon code, heavy square code, and the rotated surface code, we plot the mean number of collisions vs $\sigma_f$ for both d=3 and d=5. For the heavy hexagon code, we show the 3-frequency design ($f_1$, $f_2$, $f_3$) for both d=3 (dashed line 1102) and d=5 (solid line 1104) corresponding to the right panel of FIG. 10A, and also the 4-frequency design ($f_1$, $f_2$, $f_3$, $f_4$) at d=3 (dashed line 1106) and d=5 (solid line 1108) corresponding to the left panel of FIG. 10A. Note that the behavior of the two types of designs at d=5 are similar, with the 4-frequency design having slightly more collisions, which is expected since the lattice shape differs only on the boundary. For the heavy square code, we show the 4-frequency design for both d=3 (dashed line 1110) and d=5 (solid line 1112) corresponding to the right panel of FIG. 10B. We can conclude that the heavy hexagon and heavy square codes behave similarly for each code distance (1112 line vs. 1108 line and 1110 line vs. 1106 line). Each of these is, however, distinctly better than the rotated surface code with degree-four and a five-frequency pattern (black dashed and straight lines). Although the rotated surface code requires 10% to 20% fewer qubits than the other two codes at each lattice size, it requires qubits to be prepared nearly twice as precisely in order to eliminate frequency collisions. Or put another way, for a given lattice size (d=3 or d=5) and fabrication precision $\sigma_f$, the rotated surface code exhibits roughly an order of magnitude more frequency collisions than do the Heavy Hexagon or Heavy Square codes. Therefore, the design of error correcting codes on a low-degree graph indeed improves the fabrication of the hardware significantly.

Decoding the Heavy Hexagon and Heavy Square Codes using Flag Qubits: In the following paragraphs, when a flag qubit has a non-trivial measurement outcome, we will say that the flag qubit flagged. We also assume the following depolarizing circuit level noise model:

1. With probability p, each single-qubit gate location is followed by a Pauli error drawn uniformly and independently from {X, Y, Z}.
2. With probability p, each two-qubit gate is followed by a two-qubit Pauli error drawn uniformly and independently from $\{I, X, Y, Z\}^{\otimes 2}/\{I \otimes I\}$.
3. With probability $$\frac{2p}{3},$$

the preparation of the $|0\rangle$ state is replaced by $|1\rangle \rightarrow X|0\rangle$. Similarly, with probability $$\frac{2p}{3},$$

the preparation or the $|+\rangle$ state is replaced by $|-\rangle \rightarrow Z|+\rangle$.

4. With probability $$\frac{2p}{3},$$

any single qubit measurement has its outcome flipped.

5. Lastly, with probability p, each idle gate location is followed by a Pauli error drawn uniformly and independently from {X, Y, Z}.

Figure 5:
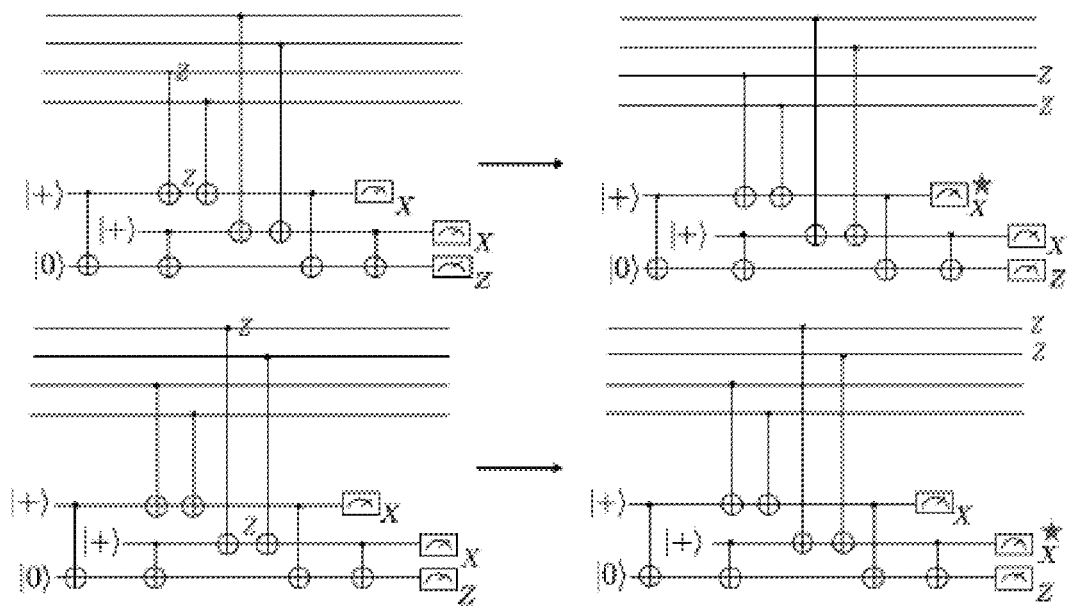
FIG. 5 is a circuit diagram depicting flag qubit outcomes arising from a single fault resulting in a weight-two data qubit error during the measurement of a weight-four operator, according to an embodiment of the present invention.

When measuring the weight-four Pauli operators in FIGS. 4 and 8, we have already discussed how a single fault can lead to a weight-two data qubit error while at the same time resulting in a flag (FIG. 5). In FIGS. 6 and 9, we illustrated the matching graphs corresponding to Z and X-type stabilizer measurements of the heavy hexagon and heavy square code by adding green vertices representing the flag measurement outcomes. For the heavy hexagon code, faults resulting in X errors during the X-type gauge operator measurements can result in non-trivial flag outcomes, and the syndrome of the resulting data qubit errors is measured during the Z-type stabilizer measurements. Flag outcomes for the heavy square code have an analogous representation but are present for both X and Z stabilizer measurements.

FIG. 7 shows a graph of edges (highlighted) that can be afflicted by an error from a single fault resulting in a left or right flag, according to an embodiment of the present invention. A highlighted cross edge corresponds to X or Z data qubit errors on edges $e_1$ and $e_2$ (which is equivalent to two data qubit errors on edges labeled $e_3$ and $e_4$ up to a stabilizer). Such edges are referred to herein as "boomerang edges" due to the shape of the highlighted area.

Figure 12:
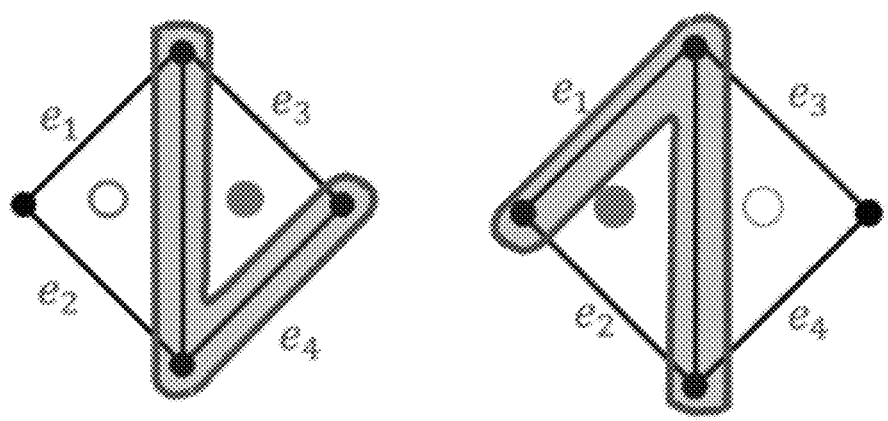
FIG. 12 shows a graph of edges (highlighted) that can be afflicted by an error from a single fault resulting in a left or right flag, according to an embodiment of the present invention.

As shown in FIG. 12, edges (data qubits) can be afflicted by an error from a single fault resulting in a flag. Due to the shape of the highlighted area, such edges are referred to as boomerang edges. Each diamond has two green vertices (which we refer to as left or right flags) since two flag qubits are used to measure the weight-four operators of the heavy hexagon and heavy square code. Note that flags can also arise from measurement errors. Therefore, flag qubits can flag without the presence of data qubit errors. However, by analyzing the circuits of FIGS. 4 and 8, it can be shown that a single fault which results in both left and right flags cannot induce data qubit errors. Thus, when both left and right flags are highlighted, information from the flag qubit measurement outcomes is ignored.

A new decoding algorithm is provided herein which integrates the flag qubit measurement outcomes into the minimum weight perfect matching algorithm to ensure that errors arising from at most (d−1)/2 faults are always corrected. The decoder should be efficient so that it can be implemented via Pauli frame updates. In order to do so, we make the following observations. Note that a single fault resulting in a left or right flag occurs with probability $\mathcal{O}(p)$. In general, m left or right flags, each arising from a single fault, will occur with probability $\mathcal{O}(p^m)$. Therefore in the presence of m flags, a data qubit error on an edge outside of the boomerang edges must occur with probability $\mathcal{O}(p^{m+1})$ where l≥1.

Since data qubit errors within boomerang edges occur with probability $\mathcal{O}(p)$, weights of edges E outside of the boomerangs are renormalized so that $w_E = -\log p^m P_E$ whereas the weights of edges within the boomerang's are computed based on the leading order error configurations giving rise to those edges. More formally, the decoding protocol using the flag qubit measurement outcomes is given as follows.

Decoding Protocol using Flag Qubits: Consider a distance d heavy hexagon or heavy square code. After performing d rounds of error syndrome measurements, suppose there are a total of m left or right flag outcomes associated with the graph G.

1. Leave all edge weights inside the boomerangs corresponding to left or right flag outcomes unchanged.
2. Let E be an edge outside a highlighted boomerang and $P_E$ the probability of all error configurations resulting in an error on edge E. Replace $P_E$ by $P_E' = p^m P_E$.
3. Replace the edge weight $w_E$ of E by $w_E' = -\log P_E'$
4. Define G' to be the graph G with new edge weights computed from the previous steps.
5. Vertices in G' are highlighted if the corresponding X- or Z-type stabilizer outcomes change in two consecutive rounds. If an odd number of vertices are highlighted, highlight a boundary vertex.
6. Implement the minimum weight perfect matching algorithm on the graph G' to identify all pairs of highlighted vertices to be matched.
7. Find the minimum weight path connecting all pairs of matched vertices of G'.
8. If G' is a d-dimensional graph, the highlighted edges in G' are mapped to edges in the corresponding d−1 dimensional planar graph added modulo two.
9. The correction is applied to the remaining highlighted edges.

Note that the probabilities assigned to edges outside of the boomerang's do not always correspond to the correct probability distribution for such edges. As an example, suppose there are m flags and two data qubit Z errors outside the boomerang's for a graph associated with the X-stabilizer measurements. Assume that the Z errors result in two highlighted vertices as for example, in FIG. 13 (where one flag qubit flagged).

Figure 13:
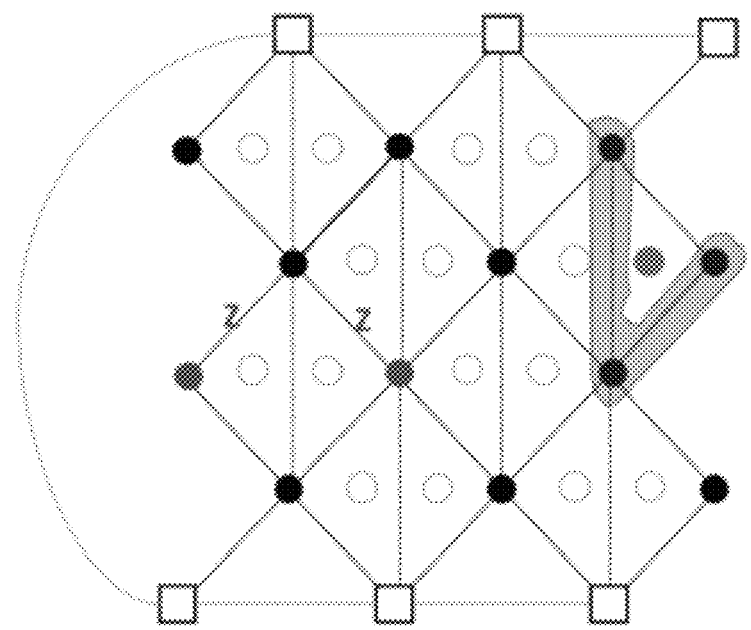
FIG. 13 shows a graph $G_x$ where an example of two Z errors result in two highlighted vertices for the graph, according to an embodiment of the present invention.

FIG. 13 shows a graph $G_x$ where an example of two Z errors result in two highlighted vertices for the graph, according to an embodiment of the present invention. We consider the case where another fault occurs which results in a flag as shown in FIG. 13. The assigned probability for the path connecting the two vertices is $\mathcal{O}(p^{2(m+1)})$ instead of the actual probability $\mathcal{O}(p^{m+2})$ and thus has a higher weight. One could be concerned that the high preference to edges within a boomerang could distort paths such that a correctable error configuration (under standard minimum weight perfect matching) would go uncorrected. However, as we show below, the decoder described above can correct error configurations arising from at most $(d-1)/2$ faults and is thus fault-tolerant.

Figure 14:
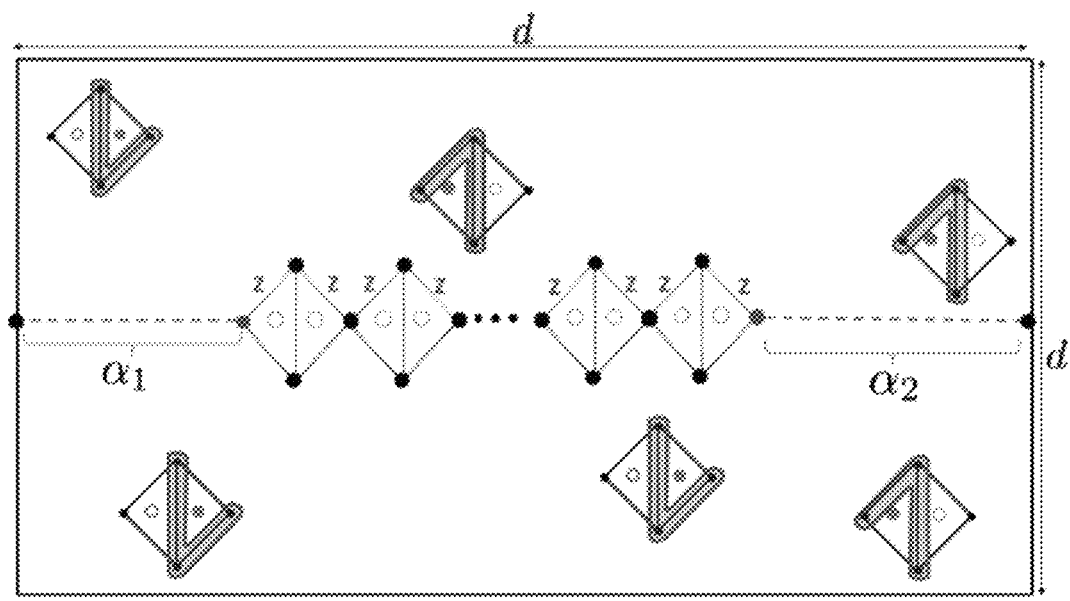
FIG. 14 is a graph illustrating a case where there are $m_1$ flags, each resulting from a measurement error, and $m_2$ consecutive Z errors resulting in two highlighted vertices, according to an embodiment of the present invention.

Consider the worst case scenario $m_1>0$ flags occur which are all caused by measurement errors so that paths within boomerangs contain no data qubit errors. In addition, suppose there are $m_2$ consecutive X or Z data qubit errors (whether it is X or Z is irrelevant as long as all errors are of the same type) which result in two highlighted vertices. We are interested in the case where $m_1+m_2 \le (d-1)/2$ so that the total number of data qubit errors is correctable by the code. Thus the number of edges $\alpha_1$ and $\alpha_2$ connecting the two high-lighted vertices to the nearest boundary of the graph satisfies the relation $\alpha_1+\alpha_2 \ge (d+1)/2$. An illustration is provided in FIG. 14.

FIG. 8 is a graph illustrating a case where there are $m_1$ flags, each resulting from a measurement error, and $m_2$ consecutive Z errors resulting (the particular error type is not important) in two highlighted vertices, according to an embodiment of the present invention. We have the constraint that $m_1+m_2 \le (d-1)/2$. The graph can be any graph associated to a distance d heavy square or heavy hexagon code. Hence $\alpha_1+\alpha_2 \ge (d+1)/2$. The dark lines represent the boundaries of the graph. Clearly, the path which corrects all the data qubit errors is one which goes through all the diamonds shown in FIG. 14 which does not contain a boomerang (the edges belonging to the correct path are highlighted). However each edge E along such path has a weight $w_E = -\log p^{m_1} P_E$ compared to the edges E' in the boomerangs which have a weight $w'_E = -\log P_{E'}$. For the boomerangs to distort the minimum weight path connecting the highlighted vertices in such a way that a logical fault occurs, the path would need to connect the highlighted vertices to the boundary of the graph. However, since $m_1+m_2 \le (d-1)/2$, there are at least $(d+1)/2$ edges along such a path that does not belong to a boomerang and thus has a weight $w_E = -\log p^{m_1} P_E$. Consequently, such a path would have weight $w_1 \ge -\log p^{m_1(d+1)/2} \Pi_E P_E$ compared to the path which corrects the errors which has weight $w_2 < -\log p^{m_1(d-1)/2} \Pi_E P_E$ which has smaller weight. The products are over all edges E' and E along the diamonds of the paths of length at least $(d+1)/2$ and the path which corrects the errors which has length less than $(d-1)/2$. Therefore the minimum weight path will correct the errors as required.

Information from flag qubit measurement outcomes can be used in a neural network decoder to decode topological color codes resulting in improved thresholds. However, the scheme may not be scalable as it requires an exponential increase in training data as a function of the code distance.

Figure 15A:
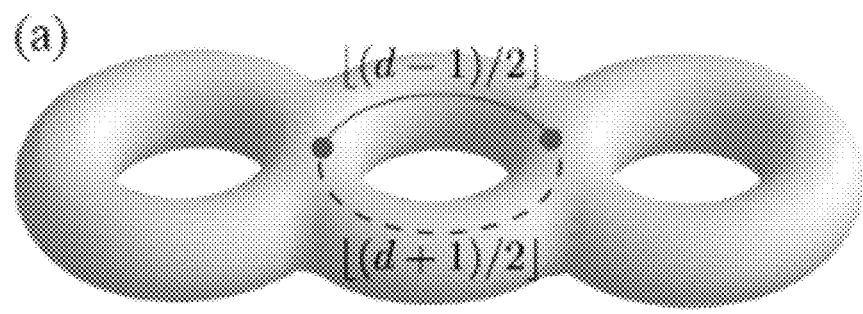
FIG. 15A shows minimum-weight paths on a genus-g surface, according to an embodiment of the present invention.

Although the above discussion applies to heavy square/hexagon codes and more generally to topological stabilizer codes with open boundaries, it also applies to the cases when these codes are defined on a closed surface (no boundaries) with nonzero genus g. The above analysis can be straightforwardly adopted to the g=1 case, i.e., codes defined on a torus, which can be constructed by identifying the opposite edges of the square patch (periodic boundary condition) in FIG. 14. In the general genus-g case, the code distance d is given by the systole of the entire surface, i.e., the shortest non-contractible loop. The logical operators correspond to the non-contractible loops on the surface characterized by the first homology group $H_1 = \mathbb{Z}_2^{2g}$. In order to distort the minimum-weight path to form a non-contractible loop corresponding to a logical error, as illustrated by FIG. 15A. The distorted path again needs to have at least $\lfloor(d+1)/2\rfloor$ edges outside boomerang edges which has higher weight than the actual error path with length $\lfloor(d-1)/2\rfloor$.

Figure 15B:
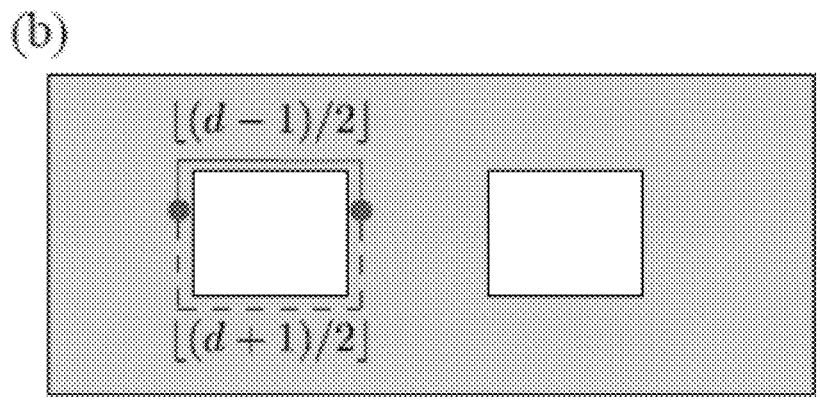
FIG. 15B shows minimum-weight paths on a surface with hole defects, according to an embodiment of the present invention.

FIG. 15A shows minimum-weight paths on a genus-g surface, according to an embodiment of the present invention. FIG. 15B shows minimum-weight paths on a surface with hole defects, according to an embodiment of the present invention. The dots indicate the syndromes. The solid lines connecting the dots correspond to the actual data qubit error string and the correct minimum-weight path. The dashed lines connecting the dots indicate the distorted path which will induce a logical error.

Similarly, the same proof also applies to the case where logical information is encoded using holes with gapped boundaries, as illustrated by FIG. 15B, as well as the most general case where all of these encoding schemes coexist. We expect that the case with twist defects also works. Hence, there exists topological stabilizer codes with flag qubits defined on a genus-g surface with p open boundaries, q holes such that the flag decoding scheme achieves fault tolerance with the full code distance (g, p, q $\in \{0, \mathbb{N}^+\}$).

We have proved the existence with the explicit construction of the heavy-square topological code, which has essentially the same topology-dependent logical encoding as the conventional toric code (e.g., both corresponding to the homology group $H_1 = \mathbb{Z}_2^{2g}$ on a genus-g surface). The explicit construction of (1) the heavy-square code on a high-genus surface by gluing two layers of punctured surfaces and (2) the heavy-square code with hole defects are shown in the following paragraphs, in Appendix B. The heavy-hexagon subsystem code, on the other hand, is "half-topological" (corresponding to the Z-stabilizers) as mentioned above and it turns out that the flag decoding scheme also achieves fault-tolerance with the full code distance. We note that, for the heavy-hexagon code, the dependence of the logical subspace dimension and encoding on the topology is more subtle than an actual topological code.

Lastly, we point out that for codes with stabilizers of weight w>4, depending on the support of logical operators, one could potentially require v-flag circuits to measure the stabilizers where $$v = \frac{w}{2} - 1.$$

If a v-flag circuit is required (with v>1), then edges are renormalized based on the number of faults that resulted in a particular flag outcome. For instance, if two faults resulted in a particular flag outcome, then edges with support on the data qubits that could have errors resulting from the flags are renormalized by p, and edges not in the support are renormalized by $P_2$. Thus, to guarantee the correction of errors arising from up to $[(d-1)/2]$ faults, extra flag qubits could be required to distinguish how many faults resulted in a particular flag outcome.

Numerical Results: Using the decoding protocol with flag qubits and the edge weights given in the following paragraphs, at Appendix A, we compute the logical error rates of the heavy hexagon and heavy square codes for odd distances 3<d<13. Error rates are computed by performing $10^7$ Monte Carlo simulations given the noise model described above. Logical X and Z error rates for both codes are shown in FIGS. 16A-16B and 17A-17B.

Figure 16A:
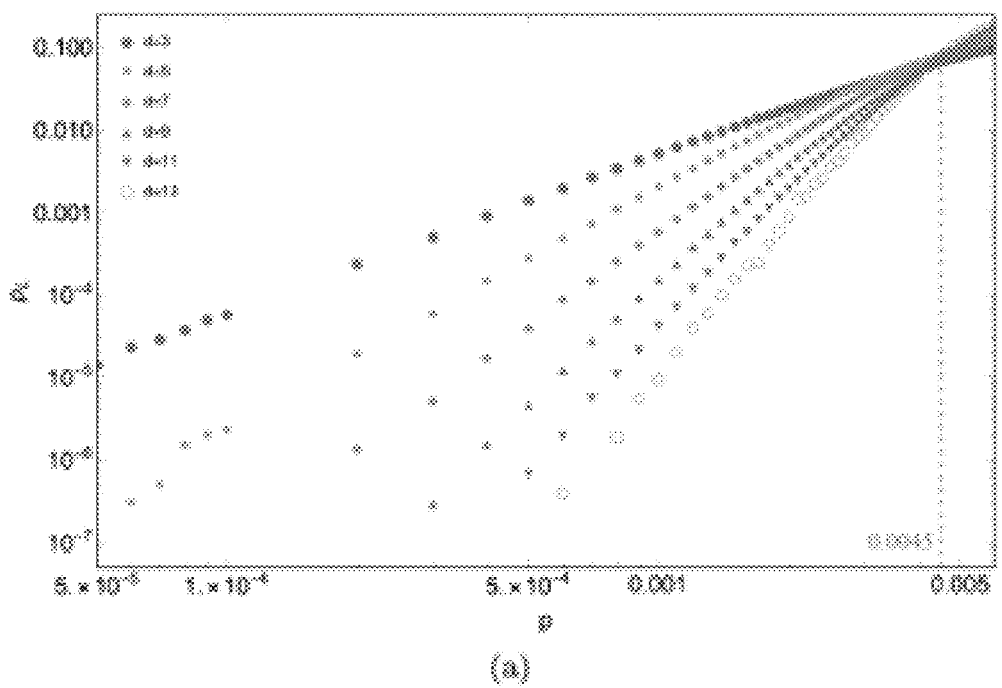
FIG. 16A shows a plot of logical X error rates, according to an embodiment of the present invention.
Figure 16B:
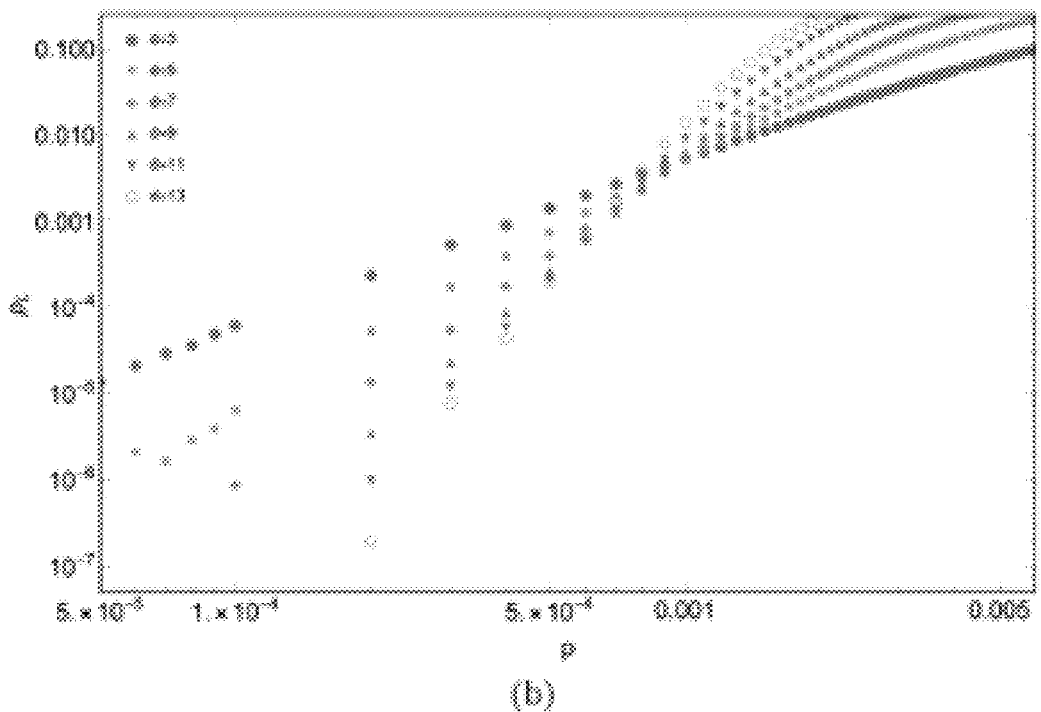
FIG. 16B shows a plot of logical Z error rates for the heavy hexagon code, according to an embodiment of the present invention.

FIG. 16A shows a plot of logical X error rates, according to an embodiment of the present invention. FIG. 16B shows a plot of logical Z error rates for the heavy hexagon code, according to an embodiment of the present invention. The asymptotic threshold for logical X errors is approximately $p_{th}$=0.0045. Since Z errors are corrected using a Bacon-Shor type stabilizers, there is no threshold for Z errors.

Figure 17A:
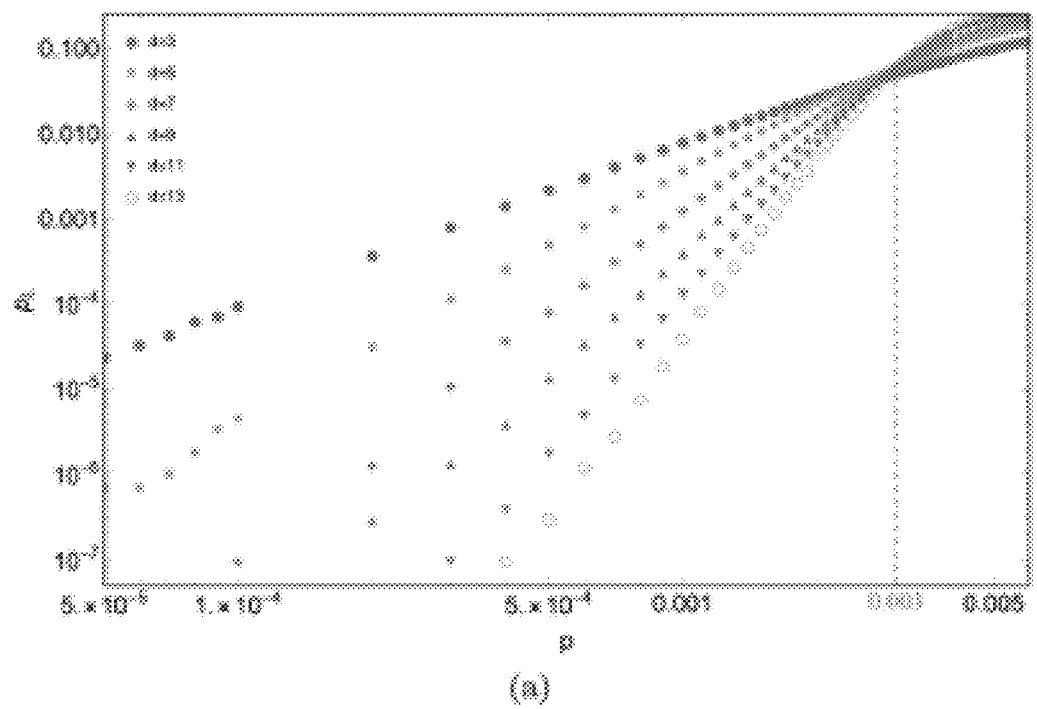
FIG. 17A shows a plot of logical X error rates, according to an embodiment of the present invention.
Figure 17B:
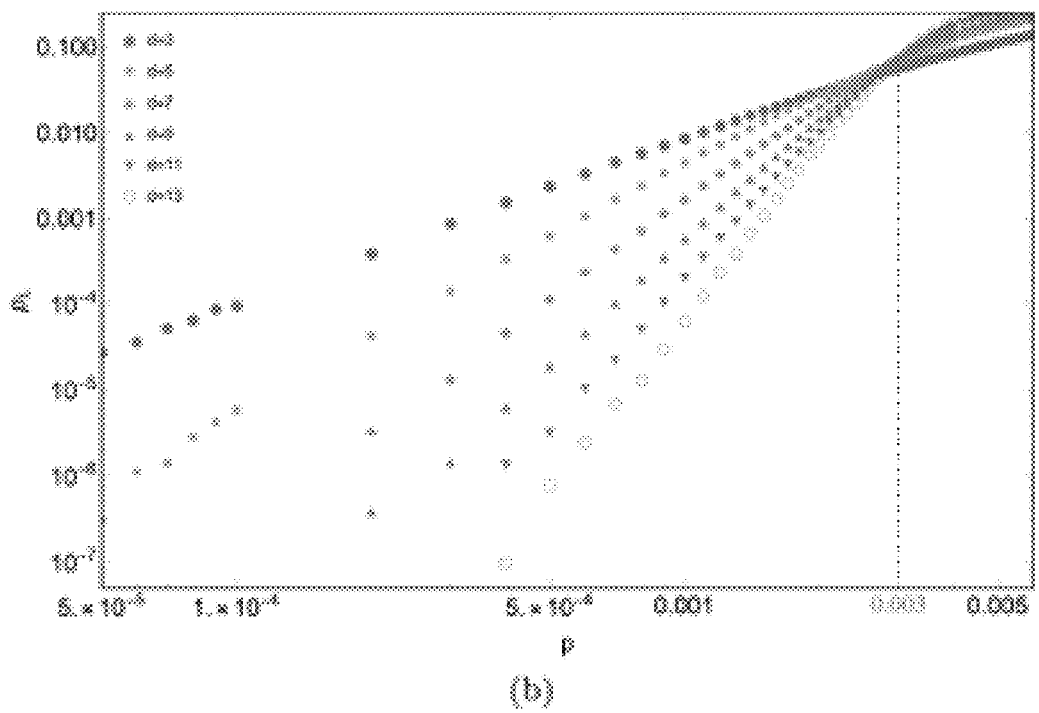
FIG. 17B shows a plot of logical Z error rates for the heavy square code, according to an embodiment of the present invention.

FIG. 17A shows a plot of logical X error rates, according to an embodiment of the present invention. FIG. 17B shows a plot of logical Z error rates for the heavy square code, according to an embodiment of the present invention. The asymptotic threshold can be seen to be approximately $p_{th}$=0.003.

For the heavy hexagon code, since Z errors are corrected using Bacon-Shor type stabilizers, there is no threshold for logical Z errors (FIG. 16B). However for physical error rates close to $10^{-4}$, it can be seen that the logical error rate does decrease significantly for the code distances that were considered. X-type errors are corrected using a surface-code type decoding scheme. The X-error rate threshold was found to be $p_{th}$=0.0045 which is fairly competitive with results obtained for the surface code. Similarly to logical X error rates of the heavy hexagon code, the heavy square code also exhibits high thresholds even though the circuit depth for the stabilizer measurements are 14 compared to 6 for the surface code. For both logical X and Z errors, the computed asymptotic threshold is found to be approximately be $p_{th}$=0.003.

A large reason for the high threshold values obtained (despite the large circuit depths) is due to our new decoding scheme which uses information from the flag qubit measurement outcomes. We already shown in the above paragraphs that the full code distance can be achieved. To further support this feature, we also compute the logical error rates for the heavy square code ignoring the flag qubit measurement outcomes and using standard minimum weight perfect matching methods used for the surface code. The plots are shown in FIGS. 18A and 18B.

Figure 18A:
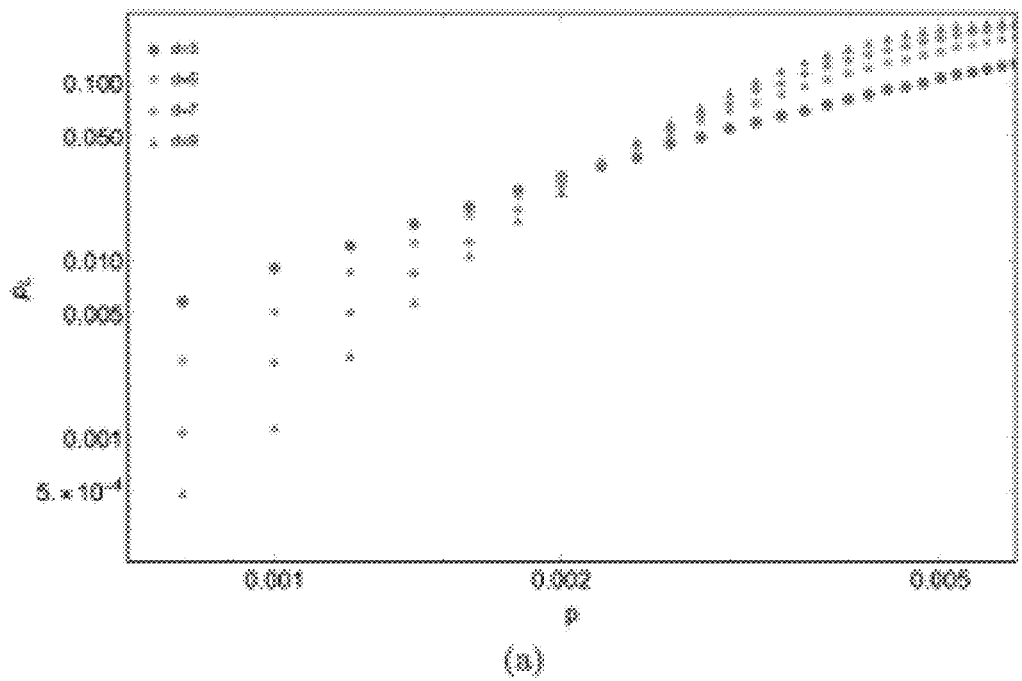
FIG. 18A shows a plot of logical X error rates when flag qubit information is ignored, according to an embodiment of the present invention.
Figure 18B:
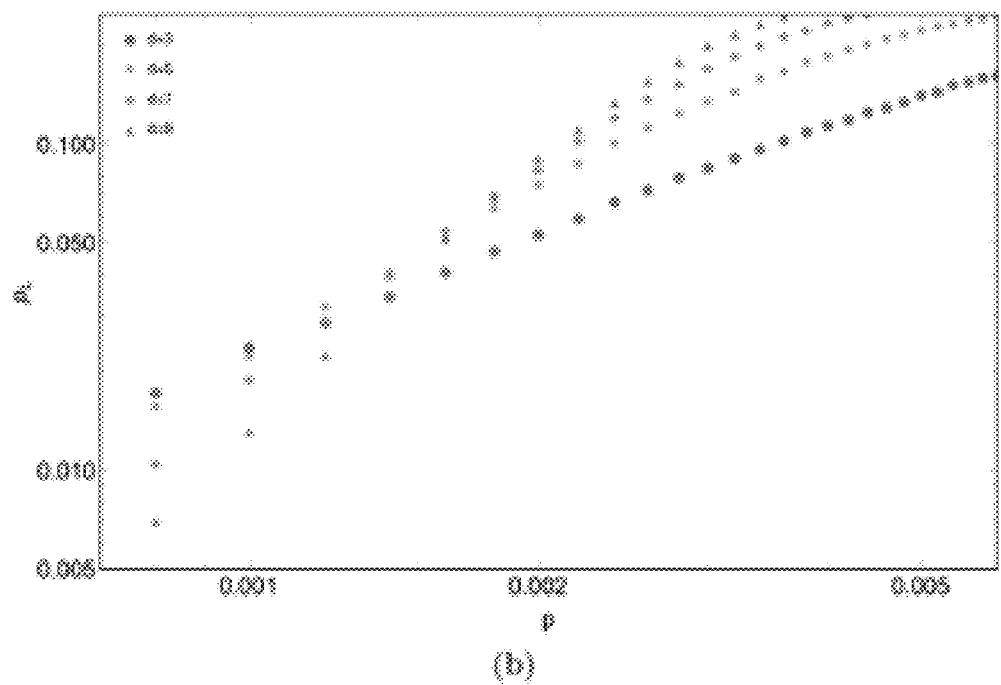
FIG. 18B shows a plot of logical Z error rates for the heavy square code when flag qubit information is ignored, according to an embodiment of the present invention.

FIG. 18A shows a plot of logical X error rates when flag qubit information is ignored, according to an embodiment of the present invention. FIG. 18B shows a plot of logical Z error rates for the heavy square code when flag qubit information is ignored, according to an embodiment of the present invention. The threshold for logical X errors is approximately $p_{th}$=0.002, half the value obtained when flag information is used to correct errors. Furthermore, due to the error propagation properties of the heavy square code, logical Z error rates are about an order of magnitude worse than compared to those obtained when flag information is kept.

As we discussed in the above paragraphs, weight-two Z errors arising from a single fault are parallel to the logical Z operator of the heavy square code. Therefore, it is not surprising to see that when flag information is ignored, the logical Z error rates in FIG. 18B are about an order of magnitude higher than those in FIG. 17B. In addition, the threshold for logical X errors in FIG. 18A is approximately $P_{th}$=0.002 which is less than half the value obtained when flag information is used to correct errors.

APPENDIX A: EDGE WEIGHTS CALCULATIONS FOR THE MATCHING GRAPHS

In this appendix we provide examples of how to compute the weights of the edges for the graphs of FIGS. 6 and 9. We then give the edge weights for all edges in the graphs used for correcting X and Z Pauli errors.

Consider the circuit containing the scheduling of the CNOT gates of the heavy hexagon code in FIG. 2. In what follows, we focus on CNOT gates in the bulk of the lattice. An error of the form XX occurring after the CNOT gate implemented at time step 8 for a Z-type parity measurement will result in a X error on the corresponding data qubit, which will then propagate through the CNOT gate implemented in the ninth time step. Thus, both Z-type parity measurements interacting with a bulk data qubit will detect the X error in one measurement round and will contribute to the edge weight of 2D TLBR (FIG. 19).

FIG. 19 shows the calculated probability for various configurations of graphs with edges and vertices, according to an embodiment of the present invention. The label TLBR corresponds to "top left to bottom right." The label BLTR corresponds to "bottom left to top right." The cross edge is only activated when left or right flag occurs. 3DV corresponds to the vertical edge associated with measurement errors in the ancilla qubits. The full list of errors which contribute to the weight of 2D TLBR are {XX, YY, XY, YX} for CNOT's at the eight time step, {XI, X Z, YI, YZ} for CNOT's at the ninth time step (on the lower right of a white face), {IX, ZX, IY, ZY} for CNOT's at the third time step and fourth time step (lower left of the X-type gauge operator measurement) and data qubit X and Y errors. From the noise model provided above, the total probability (to leading order in p) for an error to result in an edge E of type 2D TLBR is given by $$P_E = \frac{16p}{15}\left(1 - \frac{4p}{15}\right)^3\left(1 - \frac{2p}{3}\right) + \frac{2p}{3}\left(1 - \frac{4p}{15}\right)^4.$$

On the other hand, an error of type XI occurring after a CNOT at the eight time step (where X is on the control qubit of the CNOT) will introduce a data qubit error which will propagate through the CNOT applied at the ninth time step.

Hence for the measurement round at which the error occurred, only one of the two ancillas in the Z-type parity measurements will be highlighted. In the next measurement round, the data qubit will have an X error so that both of the ancillas of the Z-type parity measurement will be highlighted. Therefore, such an error will result in the edge 3D TLBR of FIG. 19. The types of errors leading to such an edge are {XI, X Z, YI, YZ} for CNOT's at the eight time step and {XX, YY, XY, YX} for CNOT's at the ninth time step (bottom right of a white face in FIG. 2). Hence to leading order in p, the probability associated with the edge 3D TLBR is given by $$P_E = \frac{8p}{15}\left(1 - \frac{4p}{15}\right).$$

The probabilities associated with the other edges of FIG. 19 can be computed using similar methods as the ones described above.

Using the same methods as above, we computed the edge weights for the edges corresponding to the X-type gauge operator measurements of the heavy-hexagon code (FIG. 6A). However, one important difference is that only the odd parity of a configuration of errors are relevant when decoding Bacon-Shor type codes. Taking into account all odd configurations of errors giving rise to particular edge types, we obtain $$P_{b_1} = \sum_{n=1}^{\frac{d+1}{2}} \sum_{m=0}^{\frac{3d-3}{2}} \binom{d}{2n-1}\left(\frac{2p}{3}\right)^{2n-1}\left(1-\frac{2p}{3}\right)^{d-(2n-1)}\binom{3d-2}{2m} \tag{A1}$$

$$\left(\frac{8p}{15}\right)^{2m}\left(1-\frac{8p}{15}\right)^{3d-2-2m} + \sum_{n=0}^{\frac{d+1}{2}} \sum_{m=1}^{\frac{3d-1}{2}} \binom{d}{2n}\left(\frac{2p}{3}\right)^{2n}$$

$$\left(1-\frac{2p}{3}\right)^{d-2n}\binom{3d-2}{2m-1}\left(\frac{8p}{15}\right)^{2m-1}\left(1-\frac{8p}{15}\right)^{3d-2-(2m-1)},$$

$$P_{d_2} = \frac{1}{2} - \frac{1}{2}\left(\frac{8p}{15} - 1\right)^{2d-2}, \tag{A2}$$

$$P_{d_1} = \frac{1}{2} - \frac{1}{2}\left(1 - \frac{8p}{15}\right)^{2d}, \tag{A3}$$

$$P_{d_1'} = \frac{8p}{15}\left(1 - \frac{4p}{15}\right). \tag{A4}$$

-continued $$P_{b_m} = \tag{A5}$$

$$\sum_{n=1}^{\frac{d+1}{2}} \sum_{m=0}^{\frac{d-1}{2}} \sum_{l=0}^{d} \binom{d}{2n-1}\left(\frac{2p}{3}\right)^{2n-1}\left(1-\frac{2p}{3}\right)^{d-(2n-1)}\binom{2(d-1)}{2m}$$

$$\left(\frac{8p}{15}\right)^{2m}\left(1-\frac{8p}{15}\right)^{2(d-1)-2m} \cdot \binom{2d}{2l}\left(\frac{4p}{15}\right)^{2l}\left(1-\frac{4p}{15}\right)^{2d-2l} +$$

$$\sum_{n=0}^{\frac{d-1}{2}} \sum_{m=0}^{\frac{d-1}{2}} \sum_{l=1}^{d} \binom{d}{2n}\left(\frac{2p}{3}\right)^{2n}\left(1-\frac{2p}{3}\right)^{d-2n} \cdot \binom{2(-1)}{2m-1}$$

$$\left(1-\frac{8p}{15}\right)^{2(d-1)-(2m-1)}\binom{2d}{2l}\left(\frac{4p}{15}\right)^{2l}\left(1-\frac{4p}{15}\right)^{2d-2l} +$$

$$\sum_{n=0}^{\frac{d-1}{2}} \sum_{m=0}^{\frac{d-1}{2}} \sum_{l=1}^{d} \binom{d}{2n}\left(\frac{2p}{3}\right)^{2n}\left(1-\frac{2p}{3}\right)^{d-2n}\binom{2(d-1)}{2m}$$

$$\left(\frac{8p}{15}\right)^{2m}\left(1-\frac{8p}{15}\right)^{2(d-1)-2m} \cdot \binom{2d}{2l-1}\left(\frac{4p}{15}\right)^{2l-1}\left(1-\frac{4p}{15}\right)^{2d-(2l-1)} +$$

$$\sum_{n=1}^{\frac{d+1}{2}} \sum_{m=1}^{\frac{d-1}{2}} \sum_{l=1}^{d} \binom{d}{2n-1}\left(\frac{2p}{3}\right)^{2n-1}\left(1-\frac{2p}{3}\right)^{d-(2n-1)}$$

$$\binom{2(d-1)}{2m-1} \cdot \left(\frac{8p}{15}\right)^{2m-1}$$

$$\left(1-\frac{8p}{15}\right)^{2(d-1)-(2m-1)}\binom{2d}{2l-1}\left(\frac{4p}{15}\right)^{2l-1}\left(1-\frac{4p}{15}\right)^{2d-(2l-1)},$$

$$P_m = \sum_{n=1}^{\frac{d+1}{2}} \sum_{m=0}^{\frac{d-1}{2}} \sum_{l=0}^{\frac{d-1}{2}} \binom{d+1}{2n-1} \tag{A6}$$

$$\left(\frac{4p}{3}\right)^{2n-1}\left(1-\frac{4p}{15}\right)^{d+1-(2n-1)}\binom{d-1}{2m}\left(\frac{8p}{15}\right)^{2m}$$

$$\left(1-\frac{8p}{15}\right)^{d-1-2m}\binom{d+1}{2l}\left(\frac{2p}{3}\right)^{2l}\left(1-\frac{2p}{3}\right)^{d-2l} +$$

$$\sum_{n=0}^{\frac{d+1}{2}} \sum_{m=1}^{\frac{d-1}{2}} \sum_{l=0}^{\frac{d-1}{2}} \binom{d+1}{2n}\left(\frac{4p}{15}\right)^{2n}\left(1-\frac{4p}{15}\right)^{d+1-2n} +$$

$$\binom{d-1}{2m-1}\left(\frac{8p}{15}\right)^{2m-1}\left(1-\frac{8p}{15}\right)^{d-1-(2m-1)}$$

$$\binom{d+1}{2n}\left(\frac{2p}{3}\right)^{2l}\left(1-\frac{2p}{3}\right)^{d-2n} +$$

$$\sum_{n=0}^{\frac{d+1}{2}} \sum_{m=0}^{\frac{d-1}{2}} \sum_{l=1}^{\frac{d+1}{2}} \binom{d+1}{2n}\left(\frac{4p}{15}\right)^{2n}\left(1-\frac{4p}{15}\right)^{d+1-2n}$$

$$\binom{d-1}{2m}\left(\frac{8p}{15}\right)^{2m}\left(1-\frac{8p}{15}\right)^{d-1-2m}\binom{d+1}{2l-1}$$

$$\left(\frac{2p}{3}\right)^{2l-1}\left(1-\frac{2p}{3}\right)^{d-(2l-1)} +$$

$$\sum_{n=1}^{\frac{d+1}{2}} \sum_{m=1}^{\frac{d-1}{2}} \sum_{l=1}^{\frac{d+1}{2}} \binom{d+1}{2n-1}\left(\frac{4p}{15}\right)^{2n-1}$$

$$\left(1-\frac{4p}{15}\right)^{d+1-(2n-1)}\binom{d-1}{2m-1}\left(\frac{8p}{15}\right)^{2m-1}\left(1-\frac{8p}{15}\right)^{d-1-(2m-1)}$$

$$\binom{d+1}{2l-1}\left(\frac{2p}{3}\right)^{2l-1}\left(1-\frac{2p}{3}\right)^{d-(2l-1)}.$$

Lastly, the probabilities associated with the edges for X and Z stabilizer measurements of the heavy square code are the same as those in FIG. 19 except for the edge 3DV, which has $$P_E = \frac{32p}{15}\left(1-\frac{8p}{15}\right)^3\left(1-\frac{4p}{15}\right)^4\left(1-\frac{2p}{3}\right) + \frac{16p}{15}\left(1-\frac{8p}{15}\right)^4\left(1-\frac{4p}{15}\right)^3\left(1-\frac{2p}{3}\right) + \frac{2p}{3}\left(1-\frac{8p}{15}\right)^4\left(1-\frac{4p}{15}\right)^4$$

(for both graphs in FIG. 9).

APPENDIX B: ENCODING LOGICAL QUBITS INTO A HIGH-GENUS SURFACE AND A SURFACE WITH HOLE DEFECTS

In this appendix, we explicitly construct the heavy-square codes on a high-genus surface or a surface with hole defects, in order to prove the statement I "There exists topological stabilizer codes with flag qubits defined on a genus-g surface with p open boundaries, q holes such that the flag decoding scheme achieves fault tolerance with the full code distance (g, p, q∈{0,ℕ⁺})." In this way, we also show the more general encoding scheme that multiple logical qubits are encoded into a single code block, which can facilitate the logical gate operation.

High-Genus Surface: A straightforward way to construct a high-genus surface is to have two layers of heavy-hexagon codes with holes, and "glue" them together along the boundaries of the holes and the outer edges of the two layers. Here, by "gluing", we mean identifying the corresponding qubits along the top and bottom layers along the corresponding boundaries. In other words, the two identified qubits on the two layers are experimentally implemented with a single qubit. We illustrate the construction of a g=3 surface in FIGS. 20A and 20B.

FIG. 20A shows a g=3 surface with the illustration of logical strings on three non-contractible cycles, according to an embodiment of the present invention. FIG. 20B shows an explicit construction of the g=3 surface by identifying the hole boundaries and outer edges of two layers of heavy-square topological codes, according to an embodiment of the present invention. The dashed lines show the identification of the hole boundaries and outer edges. The vertically aligned plaquettes on the top and bottom layers have different types of stabilizers (indicated by different colors). FIG. 20C shows logical strings corresponding to those shown in FIG. 20A, according to an embodiment of the present invention. The parenthesis indicate Pauli operators identified with those on the top layers, which hence should not be included when counting the weight of the logical strings.

The vertical dashed lines in FIG. 20B show all the identified data and ancilla qubits. In particular, the darker dashed lines represent the gluing of the hole boundaries and the lighter dashed lines represent the gluing of the outer edges of the two layers. Note that the X and Z plaquettes aligned vertically are switched for the top and bottom layers, which ensures that the neighbors of the X plaquettes are always the Z plaquettes and vice versa.

We also illustrate the corresponding logical strings in the bilayer systems in FIG. 20C which corresponds to the logical strings along three different non-contractible cycles in FIG. 20A. As we can see these three logical strings have minimum operator support 6, 4, and 4 respectively. Therefore, in this specific example, the length of the systole (i.e., the shortest non-contractible loop) of this surface and hence the code distance is d=4. Typically one can construct the surface such that all these logical strings have the same length in order to optimize the information storage. As we have stated in statement I above, the flag decoder can correct up to $\lfloor(d-1)/2\rfloor$ faults, i.e., with weight less than half of the systole length. This can be seen from the fact that the measured operators have weight at most four. Therefore, weight-two errors arising from a single fault will lie in boomerang edges.

Hole Defects: A more experimentally feasible way is to encode multiple logical qubits into a single-layer planar code with hole defects. FIG. 21A shows a double Z-cut logical qubit consisting of two smooth whole defects, on the left and a double X-cut logical qubit consisting of two rough hole defects, on the right, according to an embodiment of the present invention. FIG. 21B depicts the explicit construction of the two types of logical qubits with hole defects on the heavy-square topological code, according to an embodiment of the present invention. As shown in FIGS. 21A and 21B, we can construct two types of hole defects equivalent to the smooth defect (Z-cut qubit) and rough defect (X-cut qubit) in the standard surface codes respectively. As shown in FIG. 21B, the smooth defect (Z-cut) has only X-type weight-two stabilizers on the hole boundary, while the rough defect (X-cut) has only Z-type weight-two stabilizers on the hole boundary. In this example, we show a "double Z-cut qubit" on the left and a "double X-cut qubit" on the right. The double Z-cut qubit has the logical Z-string going around the holes, while the logical X-string connecting the two wholes, with length 6 and 3 respectively. On the other hand, the double X-cut qubit has the logical X-string going around the holes, while the logical X-string connecting the two wholes. The code distance in this case is d=3, i.e. the length of the shortest logical string. Again, the flag decoder can correct up to $\lfloor(d-1)/2\rfloor$ faults in this case as well. Braiding of a Z-cut defect around another X-cut defect implements a logical CNOT gate.

Twist Defects: Besides the hole defects, using twist defects is another realistic way to encode logical qubits while possess additional computation power than the hole defects. FIG. 22A shows encoding two logical qubits into four pairs of twist defects, according to an embodiment of the present invention. FIG. 22B shows stabilizers around the twist defects, according to an embodiment of the present invention. FIG. 22C shows two types of logical operators around the twist defects, according to an embodiment of the present invention.

As it can be appreciated from the above paragraphs, we introduce two families of codes which are called the heavy hexagon code and heavy square code. The heavy hexagon code (where qubits are located on a heavy hexagonal lattice) is a hybrid surface/Bacon-Shor code where weight-four X-type gauge operators form Bacon-Shor type stabilizers and products of weight-two Z-type gauge operators form surface code type stabilizers. The heavy square code is a family of surface codes mapped onto a heavy square lattice. Both code families achieve the goal of reducing frequency collisions resulting in an improved yield (in some cases by several orders of magnitude) compared to the surface code for superconducting qubit architectures using the CR gate. For the heavy square code, the stabilizer measurement are weight four and weight two stabilizers of the surface code. For the heavy hexagon code, the weight four measurements for correcting phase errors are not measurements of surface code stabilizers, but instead measurements of weight-four Bacon-Shor type gauge operators. For correcting bit-flip errors, one measures pairs of weight-two Z-type gauge operators (the product of which forms a stabilizer).

One of the ingredients in the fault-tolerant implementation of the above codes are the use of flag qubits for the weight-four X and Z-type gauge and stabilizer measurements. We provide a scalable decoding scheme which makes use of the flag qubit information and can correct errors up to the full code distance. Performing Monte Carlo simulations for a depolarizing noise model, we show that the heavy square code exhibits competitive threshold values (approximately $p_{th}$=0.003) with the surface code. Since Z errors are corrected via Bacon Shor type decoding schemes for the heavy hexagon code, there is no threshold for Z errors (although low logical error rates can be achieved for physical error rates in the order of $10^{-4}$). However, the heavy hexagon code achieves a threshold of approximately $p_{th}$=0.0045 for X errors.

We also show how our flag-qubit decoding scheme can be applied to codes defined on a surface with nonzero genus g. The flag-qubit decoding scheme can also be applied to topological codes with stabilizers of weight greater than four (such as the color code) to ensure that errors are corrected up to the full code distance. Such an approach may result in thresholds which are closer to thresholds obtained for surface codes. When including the overhead cost of performing a universal gate set, such codes with flag qubit decoders may be a preferred alternative to the surface code. The methods described herein can also be applied to topological codes with twist defects and to more general subsystem codes. We also point out that in the presence of m flags, instead of renormalizing edge probabilities for edges outside boomerangs by $p^m P_E$, numerical optimizations can also be performed to find the optimal coefficient a (potentially using machine learning techniques) such that edge probabilities would be renormalized by $p^\alpha P_E$. However, such optimizations may be dependent on the underlying noise model afflicting the stabilizer measurement circuits.

Lastly, some families of subsystem codes achieve better error correcting capabilities compared to the surface code in the presence of leakage errors. It is therefore possible to analyze the performance of codes defined on low degree graphs in the presence of leakage errors to determine whether such codes also have favorable error correcting capabilities compared to surface code implementations.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A method of error correction for a quantum computer, comprising:
    identifying each of a plurality of physical qubits arranged in a lattice pattern over a surface in a quantum processor of said quantum computer as a one of a data qubit, an ancilla qubit or a flag qubit so as to define a plurality of data qubits, a plurality of ancilla qubits and a plurality of flag qubits, wherein each pair of interacting data qubits in said plurality of data qubits interact with a flag qubit in said plurality of flag qubits and adjacent flag qubits both interact with a common ancilla qubit in said plurality of ancilla qubits;
    performing measurements of weight-four stabilizers, weight-two stabilizers, or both of a surface code formed using at least a sub-plurality of said plurality of physical qubits, or performing measurements of weight-four Bacon-Shor type gauge operators; and
    correcting fault-tolerantly quantum errors in one or more of said at least sub-plurality of physical qubits based on a measurement from at least one flag qubit.

2. The method according to claim 1, wherein each of said plurality of physical qubits has a resonance frequency selected from a first frequency, a second frequency, a third frequency or a fourth frequency.

3. The method according to claim 2, wherein performing said measurements comprises interacting said sub-plurality of said plurality of physical qubits using at least one of the first frequency, the second frequency, the third frequency and the fourth frequency.

4. The method according to claim 1, wherein performing measurements comprises measuring an error in a quantum circuit using at least one ancilla qubit and at least two flag qubits, the quantum circuit comprising a sub-plurality of data qubits in said plurality of data qubits and a plurality of gates.

5. The method according to claim 1, wherein performing measurements of said weight-four stabilizers or said weight-two stabilizers, or both of the surface code comprises performing an X-type stabilizer measurement to measure a phase error.

6. The method according to claim 1, wherein performing measurements of said weight-four stabilizers or said weight-two stabilizers, or both of the surface code comprises performing a Z-type stabilizer measurement to measure a bit flip error.

7. The method according to claim 1, further comprising computing an error syndrome based on said measurements.

8. The method according to claim 1, wherein performing the measurements of said weight-four stabilizers or said weight-two stabilizers, or both of the surface code comprises performing the measurements on a square lattice code.

9. The method according to claim 1, wherein performing measurements of weight-four Bacon-Shor type gauge operators comprises performing the measurements on a hexagon lattice code.

10. The method according to claim 1, wherein performing measurements of said weight-four stabilizers of the surface code comprises detecting weight-two data qubits errors arising from a fault on a C-NOT gate using a sub-plurality of flag qubits in said plurality of flag qubits.

11. The method according to claim 1, wherein performing measurements of said weight-four stabilizers of the surface code comprises measuring operators that determine the presence of errors using a sub-plurality of ancilla qubits in said plurality of ancilla qubits.

12. A method for decoding topological codes comprising:
    measuring a flag qubit in a vicinity of at least one edge and a cross-edge in a plurality of edges connecting a plurality of vertices in a weight matching graph for an X-type gauge operator measurement or for a z-type stabilizer measurement for a surface code;
    assigning a weight to said at least one edge, the weight depending on a calculated probability of said at least one edge containing a data qubit error;
    updating a weight of said plurality of edges based on said calculated probability; and correcting an error of at least a portion of said plurality of edges based on the updated weight.

13. The method according to claim 12, further comprising determining whether said at least one edge contains a data qubit error based on said measuring the flag qubit, and
when said at least one edge contains the data qubit error, calculating a probability of said at least one edge contains the data qubit error.

14. The method according to claim 13, further comprising calculating a probability of a another edge in the plurality of edges not containing the data qubit error based on the probability of said at least one edge containing the data qubit error; and assigning a weight to said other edge.

15. The method according to claim 12, further comprising:
selecting a path through the plurality of edges connecting the plurality of vertices having a lowest weight.

16. The method according to claim 15, further comprising correcting an error of at least a portion of said plurality of edges depending on said selected path.

17. The method according to claim 12, wherein said edge comprises a data qubit.

18. A system of correcting errors in a quantum computer, comprising:
a quantum processor having a plurality of physical qubits arranged in a lattice pattern over a surface of the quantum processor, the plurality of physical qubits comprising a plurality of data qubits, a plurality of ancilla qubits and a plurality of flag qubits, wherein each pair of interacting data qubits in said plurality of data qubits interact with a flag qubit in said plurality of flag qubits and adjacent flag qubits both interact with a common ancilla qubit in said plurality of ancilla qubits;
wherein at least a sub-plurality of said plurality of physical qubits are selected for performing measurements of weight-four stabilizers or weight-two stabilizers, or both of a surface code formed using the at least sub-plurality of said plurality of physical qubits, or for performing measurements of weight-four Bacon-Shor type gauge operators, and correcting fault-tolerantly quantum errors in one or more of said at least sub-plurality of physical qubits based on a measurement from at least one flag qubit.

19. The system according to claim 18, wherein each of said plurality of physical qubits has a resonance frequency selected from a first frequency, a second frequency, a third frequency or a fourth frequency.

20. The system according to claim 18, wherein the at least a sub-plurality of said plurality of physical qubits are selected for performing measurements of an error in a quantum circuit using at least one ancilla qubit and at least two flag qubits, the quantum circuit comprising a sub-plurality of data qubits in said plurality of data qubits and a plurality of gates.

21. The system according to claim 18, wherein performing measurements of said weight-four stabilizers or said weight-two stabilizers, or both of the surface code comprises performing an X-type stabilizer measurement to measure a phase error.

22. The system according to claim 18, wherein performing measurements of said weight-four stabilizers or said weight-two stabilizers, or both of the surface code comprises performing a Z-type stabilizer measurement to measure a bit flip error.

23. The system according to claim 18, wherein performing the measurements of said weight-four stabilizers or said weight-two stabilizers, or both of the surface code comprises performing the measurements on a square lattice code.

24. The system according to claim 18, wherein performing measurements of weight-four Bacon-Shor type gauge operators comprises performing the measurements on a hexagon lattice code.

25. A non-transitory computer-executable medium which when executed by a quantum computer comprising a plurality of coupled physical qubits arranged in a hexagonal lattice or a square lattice, causes a quantum processor comprising the plurality of coupled physical qubits arranged in the hexagonal lattice or the square lattice to:
perform measurements of weight-four stabilizers, weight-two stabilizers, or both of a surface code formed using at least a sub-plurality of a plurality of physical qubits, or perform measurements of weight-four Bacon-Shor type gauge operators, wherein said plurality of physical qubits comprise a plurality of data qubits, a plurality of ancilla qubits and a plurality of flag qubits, wherein each pair of interacting data qubits in said plurality of data qubits interact with a flag qubit in said plurality of flag qubits and adjacent flag qubits both interact with a common ancilla qubit in said plurality of ancilla qubits; and
correct fault-tolerantly quantum errors in one or more of said at least sub-plurality of physical qubits based on a measurement from at least one flag qubit.

* * * * *